US012730062B2

(12) United States Patent
Ma et al.

(10) Patent No.: US 12,730,062 B2
(45) Date of Patent: Sep. 8, 2026

(54) POLARIZER AND ANALYZER CONFIGURATION OPTIMIZATION METHOD AND POLARIZING AND ANALYZING SYSTEM

(71) Applicant: TSINGHUA SHENZHEN INTERNATIONAL GRADUATE SCHOOL, Shenzhen (CN)

(72) Inventors: Hui Ma, Shenzhen (CN); Qianhao Zhao, Shenzhen (CN); Zheng Hu, Shenzhen (CN); Tongyu Huang, Shenzhen (CN)

(73) Assignee: TSINGHUA SHENZHEN INTERNATIONAL GRADUATE SCHOOL, Shenzhen (CN)

( * ) Notice: Subject to any disclaimer, the term of this patent is extended or adjusted under 35 U.S.C. 154(b) by 0 days.

(21) Appl. No.: 18/415,388

(22) Filed: Jan. 17, 2024

(65) Prior Publication Data

US 2024/0167941 A1 May 23, 2024

Related U.S. Application Data

(63) Continuation-in-part of application No. PCT/CN2022/106351, filed on Jul. 19, 2022.

(30) Foreign Application Priority Data

Jul. 19, 2021 (CN) ......................... 202110811657.6
Jun. 21, 2022 (CN) ......................... 202210707222.1
Jul. 18, 2022 (CN) ......................... 202210840465.2

(51) Int. Cl.
*G01N 21/21* (2006.01)
*G01J 4/04* (2006.01)
(Continued)

(52) U.S. Cl.
CPC ................ *G01N 21/21* (2013.01); *G01J 4/04* (2013.01); *G02B 27/286* (2013.01); *G02F 1/0136* (2013.01)

(58) Field of Classification Search
CPC ...... G01N 21/01; G01N 21/211; G01N 21/21; G01N 21/23; G01N 21/19;
(Continued)

(56) References Cited

U.S. PATENT DOCUMENTS 6,956,658 B2 * 10/2005 Meeks ................. G01B 11/065 356/600
7,196,792 B2 * 3/2007 Drevillon ............. G01N 21/211 356/369
(Continued)

FOREIGN PATENT DOCUMENTS

CN 101231239 A 7/2008
CN 104161493 A 11/2014
(Continued)

OTHER PUBLICATIONS

Goudail, Francois, "Optimal Mueller Matrix estimation in the presence of additive and Poisson noise for any number of illumination and analysis states," 2017, Optics Letters, vol. 42, No. 11, pp. 2153-2156. (Year: 2017).*
(Continued)

*Primary Examiner* — Gordon J Stock, Jr.
(74) *Attorney, Agent, or Firm* — HSML P.C.

(57) ABSTRACT

A PSG and PSA configuration optimization method and a polarizing and analyzing system, wherein the method comprises the following steps: adjusting an instrumental matrix W of a PSG and an instrumental matrix A of an PSA to minimize a weighted variance EWV of the instrument matrices of the PSG and the PSA, so as to realize optimization for Gaussian noise; and a sum of each row of the
(Continued)

instrumental matrix W of the PSG and the instrumental matrix A of the PSA is 0, so that an estimated variance caused by Poisson noise is independent of the sample, and the estimated variance reaches a minimum value. The present disclosure can suppress the noise to the maximum extent and make the law of the noise independent from the sample, and the distribution law of the noise is the same regardless of the sample to be measured.

4 Claims, 14 Drawing Sheets

(51) Int. Cl.
*G02B 27/28* (2006.01)
*G02F 1/01* (2006.01)

(58) Field of Classification Search
CPC ....... G01N 2021/212; G01N 2021/213; G01N 2021/214; G01N 2021/215; G01N 2021/216; G01N 2021/217; G01N 2021/218; G02F 1/0136; G01J 4/00; G01J 4/02; G01J 4/04; G02B 27/28; G02B 27/286
See application file for complete search history.

(56) References Cited

U.S. PATENT DOCUMENTS 7,298,480 B2 * 11/2007 Garcia-Caurel .......... G01J 4/04 356/364
12,038,330 B2 * 7/2024 Lin ...................... G02B 27/283
2002/0158871 A1 10/2002 Evankow, Jr. et al.
2010/0039646 A1 2/2010 Bourderionnet et al.
2011/0205539 A1 * 8/2011 Cattelan ............... G01N 21/211 356/364
2013/0342768 A1 12/2013 Yokoyama et al.
2019/0361161 A1 11/2019 Gu et al.

FOREIGN PATENT DOCUMENTS

CN 107490547 A * 12/2017 ........... G01N 21/211
CN 108918425 A 11/2018
CN 109459138 A * 3/2019 ................ G01J 4/04
CN 107367329 B * 6/2019 ................ G01J 3/45
CN 111060711 A 4/2020
CN 111122452 A 5/2020
CN 111982825 A 11/2020
CN 112035794 A 12/2020
CN 112485930 A 3/2021
CN 113624690 A 11/2021
CN 114072645 A * 2/2022 ........... G02B 27/283
DE 102014013004 A1 3/2015
JP 2004-020343 A 1/2004
JP 2007-232550 A 9/2007
KR 101590389 B1 * 2/2016 ........... G01N 21/211
WO WO-2023227663 A1 * 11/2023 ............. G01N 21/21

OTHER PUBLICATIONS

He Chao et al., "A Stokes polarimeter based on four quadrant detector," J. Infrared Millim. Waves, vol. 35, No. 1, Feb. 2016, pp. 57-62 and 98; English abstract on p. 57.
Chen Leo et al., "Research on the influence of the angle of polarizer and quarter-wave plate on the full polarization detection," Optical Technique, vol. 42, No. 3, May 2016, pp. 255-259; English abstract on p. 259.
Zhi Dan-dan et al., "Stokes Parameter Detection and Precision Analysis Based on Rotating Quarter-Wave Plate," Spectroscopy and Spectral Analysis, vol. 36, No. 8, Aug. 2016, pp. 2655-2659; English abstract on p. 2659.
Chang Jintao, "A study on design of polarimetric measurement system for biomedical applications," Tsinghua University, Apr. 2016, 198 pages, English abstract included.
International Search Report (with English translation) and Written Opinion issued in PCT/CN2022/106351, dated Oct. 10, 2022, 13 pages provided.

* cited by examiner

POLARIZER AND ANALYZER CONFIGURATION OPTIMIZATION METHOD AND POLARIZING AND ANALYZING SYSTEM

CROSS REFERENCE TO RELATED APPLICATIONS

This application is a continuation application of PCT/CN2022/106351 filed on2022-07-19, which claims priority to CN patent application NO.CN202110811657.6 filed on 2021 Jul. 19, CN patent application NO.CN202210707222.1 filed on 2022 Jun. 21 and CN patent application NO.CN202210840465.2 filed on 2022 Jul. 18. The contents of the above-mentioned applications are all hereby incorporated by reference.

TECHNICAL FIELD

The present disclosure relates to the field of polarization optical imaging.

BACKGROUND ART

Polarization imaging technology has the advantages of non-invasive, non-damage, in-vivo and high-throughput, and is widely used in biomedicine, oceanography, atmospheric remote sensing and other fields. Polarization imaging can be divided into Stokes vector measurement and Müller matrix measurement depending on the form of polarization information finally obtained. The Stokes vector is mainly used to describe the polarization characteristics of light, and the Müller matrix is used to characterize the polarization characteristics of the sample, and the microstructure information of the medium can be further extracted through the Müller matrix, which is the biggest advantage of polarization measurement compared to traditional optical measurements. In the process of Müller matrix measurement, it is necessary to modulate the polarization of the incident light and detect the polarization property of the emergent light, thereby obtaining the nature of the impact and changes made to the polarization properties of light by the sample. Through multiple modulation and detection, the complete polarization characteristics of the sample, i.e. the Müller matrix of the sample, can be obtained. In this process, a device that modulates the polarization state of incident light is called a polarization state generator (PSG), and a device that detects the polarization properties of light is called a polarization state analyzer (PSA). PSG and PSA are similar in structure, the core of which is to modulate the polarization state of light. The PSG modulates natural light into polarized light of a specific polarization state, while the PSA inversely modulates the incident polarized light to obtain the magnitude of the incident polarized light on a specific polarization state component, and calculates to obtain the polarization properties of light.

The Stokes vector is a method of describing the polarization properties of light, expressed as a four-dimensional vector $S=[S_0\ S_1\ S_2\ S_3]^T$, $S_0$ representing light intensity; $S_1$ $I_0-I_{90}$ is a difference between a light intensity component of the light in a polarization direction of 0 degree and a light intensity component of the light in a polarization direction of 90 degrees; $S_2=I_{45}-I_{135}$ is a difference between a light intensity component in a polarization direction of 45 degrees and a light intensity component in a polarization direction of 135 degrees; $S_4=I_R-I_L$ is a difference between a light intensity component in a right-handed circularly polarization direction and a light intensity component in a left-handed circularly polarization direction. Usually, we are only concerned with the polarization properties of the light, so the normalization is performed on $S_0$, i.e. $S_0=1$, while the remaining three components are also normalized in the same proportion.

Poincaré sphere is a unit sphere used to graphically describe a Stokes vector of polarization states. Any polarization state can be mapped to a point on the Poincaré sphere, and the Poincare sphere representation of the Stokes vector is drawn as x, y and z coordinates of $S_1$, $S_2$, and $S_3$ of the Stokes vector respectively in a Cartesian coordinate system.

The Müller matrix is a transformation matrix, which reflects the change of a Stokes vector of a light before and after scattering, and $$S_{out}=M\times S_{in}$$

in the formula, $S_{out}$ is the Stokes vector of emergent light, $S_{in}$ is the Stokes vector of incident light, M is the Müller matrix, and 4×4 is a matrix. Since CCD (charge-coupled device) cannot receive polarization information, only light intensity information can be received. Therefore, in practical measurements, at least four times of independent polarizing and analyzing are required. Polarization refers to the incidence of a beam of polarized light with a known polarization state, and analyzing refers to the polarization state $S_{out}$ of the emergent light being obtained through measurement and calculation. Since the Stokes vector has four components, it is necessary to measure the intensity of at least four projection components to obtain the Stokes vector of a beam of light. A change matrix of the Stokes vector, i.e. the Müller matrix, can thus be calculated by measuring the emergent polarization state after illumination with polarized light of a plurality of different polarization states.

Polarization modulation is now mainly achieved by polarizing plate plus one or a series of phase retardation devices, whereby a plurality of different polarization states are obtained by matching different fast axis angles and phase retardation sizes of the phase retardation devices with each other. Therefore, the effect of fast axis angle and phase retardation on polarization state needs to be described first. The Müller matrix $M_{\delta,\theta}$ of a phase retardation device is:

$$\begin{bmatrix} 1 & 0 & 0 & 0 \\ 0 & \cos^2 2\theta + \sin^2 2\theta\cos\delta & \sin 2\theta\cos 2\theta(1-\cos\delta) & -\sin 2\theta\sin\delta \\ 0 & \sin 2\theta\cos 2\theta(1-\cos\delta) & \sin^2 2\theta + \cos^2 2\theta\cos\delta & \cos 2\theta\sin\delta \\ 0 & \sin 2\theta\sin\delta & -\cos 2\theta\sin\delta & \cos\delta \end{bmatrix}$$

where is δ a linear phase retardation and θ is an angular direction of a fast axis.

It is assumed that the polarization state of the incident light in this case is $S_{in}=[1\ S_1\ S_2\ S_3]^T$, where T represents a transpose of the matrix, i.e. for any full polarized light, the polarization state of the emergent light can be expressed by a formula $S_{out}=M_{\delta,\theta}\times S_{in}$. Thus, when the same defined incident light (typically linearly polarized light of 0 degree produced by a linearly polarizing plate) emerges from a phase retarder, a defined polarization state can be obtained, and by changing the fast axis angleθ or phase retardation S of the phase retardation device, the emerging polarization state will change accordingly. Thus, by varying the phase retardation device multiple times, a plurality of different and known polarization states can be obtained, constituting an instrumental matrix W of the PSG or an instrumental matrix A of the PSA.

The phase retardation device can be further divided into a fixed phase retardation (wave plate that changes the fast axis angle by rotation) and an electrically controlled polarizing element (variable phase retardation). The main advantage of the former is the high precision, while the disadvantage is that there are moving parts, which require a rotating motor to rotate the wave plate to realize the modulation of different polarization states, so the modulation speed is affected by the motor speed, which is often time-consuming. The latter are mainly liquid crystal variable retarders (LCVR), electro-optic phase retarders (EO), photoelastic modulators (PEM) and the like which change the phase retardation by changing the voltage applied across them. The main advantage is fast response, on the order of milliseconds. However, due to ambient temperature or voltage fluctuations, a certain system error is caused, and the cost is high. In addition, the phase retardation of the electrically controlled polarizing element needs cable for control, it is often not suitable for rotation with a motor, and therefore its fast axis angle cannot be freely rotated during measurement.

In order to make the measurement of Müller matrix more accurate and suppress the noise performance, the PSG and PSA can be designed and optimized.

SUMMARY OF THE INVENTION

In order to make up for the above-mentioned deficiencies of the background art, the present disclosure proposes a PSG and PSA configuration optimization method and a polarizing and analyzing system, so as to solve the problem that the accuracy is limited in Müller matrix measurement and noise cannot be well suppressed.

The technical problem of the present disclosure is solved in the following manner: the present disclosure provides a PSG and PSA configuration optimization method, including the steps of:

adjusting an instrumental matrix W of a PSG and an instrumental matrix A of a PSA to minimize an equal-weighted variance EWV of the instrument matrices of the PSG and the PSA, so as to realize optimization for Gaussian noise; and a sum of each row of the instrumental matrix W of the PSG and the instrumental matrix A of the PSA is zero, so that an estimated variance due to Poisson noise is independent of a sample, and the estimated variance reaches a minimum value.

In some embodiment, the method further includes the following technical solution that:

the PSG and the PSA of a measurement system are configured so that their polarization states are mutually orthogonal; then a minimum equal-weighted variance EWV of the instrument matrices of the PSG and the PSA are searched; an optimal configuration is achieved when the instrument matrices of the PSG and PSA satisfy conditions of the sum of rows being zero and minimum EWV simultaneously.

When the PSG and the PSA are a rotating polarizing plate and a rotating quarter-wave plate, respectively, a configuration condition for making the polarization states of the PSG and the PSA mutually orthogonal satisfies the following relationship:

$$\begin{cases} \theta'_P = \theta_P + 90^\circ \\ \theta'_R = \theta_R + 90^\circ + 90^\circ = \theta_R \end{cases}$$

in the formula, $\theta_P$ is a direction of a light transmission axis of the polarizing plate configured for a first measurement, $\theta_R$ is an angular direction of a fast axis of the quarter-wave plate configured for the first measurement, $\theta_P'$ is a direction of the light transmission axis of the polarizing plate configured for a second measurement, and $\theta_R'$ is an angular direction of the fast axis of the quarter-wave plate configured for the second measurement; the method adjusts a main light passing direction of polarization via the polarizing plate and then realizes modulation of a specific polarization state via the quarter-wave plate.

When a PSG and PSA system includes one fixed polarizing plate, one rotating half-wave plate and one rotating quarter-wave plate, a configuration condition for making the polarization states of the PSG and the PSA mutually orthogonal satisfies the following relationship:

$$\begin{cases} \theta'_H = \theta_H + 45^\circ \\ \theta'_R = \theta_R + 90^\circ + 90^\circ = \theta_R \end{cases}$$

in the formula, $\theta_H$ is an angular direction of a fast axis of the half-wave plate configured for a first measurement, $\theta_R$ is an angular direction of a fast axis of the quarter-wave plate configured for the first measurement, $\theta_H'$ is an angular direction of the fast axis of the half-wave plate configured for a second measurement, and $\theta_R'$ is an angular direction of the fast axis of the quarter-wave plate configured for the second measurement; and a modulation of a direction of linearly polarized light in the method changes from a single polarizing plate modulation to a fixed polarizing plate plus a half-wave plate, which is able to avoid inconsistency of light intensity of the linearly polarized light in different directions caused by rotating the polarizing plate when incident light is not ideal natural light.

When a PSG and PSA system includes one fixed polarizing plate and two full-wave retardation phase modulation devices, a configuration condition for making the polarization states of the PSG and the PSA mutually orthogonal satisfies the following relationship:

$$\begin{cases} \theta_P = 0^\circ \\ \theta_{F1} = 45^\circ \\ \theta_{F2} = 0^\circ \end{cases}$$

$$\begin{cases} \delta'_{F1} = 180^\circ + \delta_{F1} \\ \delta'_{F2} = \delta_{F2} \end{cases}$$

in the formula, $\delta_{F1}$ is a phase retardation of a first full-wave retardation phase modulation device configured for a first measurement, $\theta_{F1}$ is a fast axis angle thereof, $\delta_{F2}$ is a phase retardation of a second full-wave retardation phase modulation device configured for the first measurement, $\theta_{F2}$ is a fast axis angle thereof, $\delta_{F1}'$ is a phase retardation of the first full-wave retardation phase modulation device configured for a second measurement, and $\delta_{F2}'$ is a phase retardation of the second full-wave retardation phase modulation device configured for the second measurement. The method first modulates the polarization state on a circle of a $S_1OS_3$ plane on Poincaré sphere via the first full-wave retardation phase modulation device, and then obtains a target polarization state via the second full-wave retardation phase modulation device.

When the PSG and the PSA are a rotating polarizing plate and a rotating quarter-wave plate, respectively, an optimal four-point measurement configuration of the instruments of the PSG and the PSA satisfies the following relationship:

$$\begin{cases}\theta_P' = \theta_P + 90^\circ \\ \theta_R' = \theta_R + 90^\circ\end{cases}$$

$$\begin{cases}\theta_P'' = -\theta_P \\ \theta_R'' = -\theta_R\end{cases}$$

$$\begin{cases}\theta_P''' = 90^\circ - \theta_P \\ \theta_R''' = 90^\circ - \theta_R\end{cases}$$

in the formula, $\theta_P$ is a direction of a light transmission axis of the polarizing plate configured for a first measurement, $\theta_R$ is an angular direction of a fast axis of the quarter-wave plate configured for the first measurement, $\theta_P'$ is a direction of the light transmission axis of the polarizing plate configured for a second measurement, $\theta_R'$ is an angular direction of the fast axis of the quarter-wave plate configured for the second measurement, $\theta_P''$ is a direction of the light transmission axis of the polarizing plate configured for a third measurement, $\theta_R''$ is an angular direction of the fast axis of the quarter-wave plate configured for the third measurement, $\theta_P'''$ is a direction of the light transmission axis of the polarizing plate configured for a fourth measurement, and $\theta_R'''$ is an angular direction of the fast axis of the quarter-wave plate configured for the fourth measurement.

When a PSG and PSA system includes one fixed polarizing plate, one rotating half-wave plate and one rotating quarter-wave plate, an optimal four-point measurement configuration of the PSG and the PSA satisfies the following relationship:

$$\begin{cases}\theta_H' = \theta_H + 45^\circ \\ \theta_R' = \theta_R + 90^\circ\end{cases}$$

$$\begin{cases}\theta_H'' = -\theta_H \\ \theta_R'' = -\theta_R\end{cases}$$

$$\begin{cases}\theta_H''' = 45^\circ - \theta_H \\ \theta_R''' = 90^\circ - \theta_R\end{cases}$$

in the formula, $\theta_H$ is an angular direction of a fast axis of the half-wave plate configured for a first measurement, $\theta_R$ is an angular direction of a fast axis of the quarter-wave plate configured for the first measurement, $\theta_H'$ is an angular direction of the fast axis of the half-wave plate configured for a second measurement, $\theta_R'$ is an angular direction of the fast axis of the quarter-wave plate configured for the second measurement, $\theta_H''$ is an angular direction of the fast axis of the half-wave plate configured for a third measurement, $\theta_R''$ is an angular direction of the fast axis of the quarter-wave plate configured for the third measurement, $\theta_H'''$ is an angular direction of the fast axis of the half-wave plate configured for a fourth measurement, and $\theta_R'''$ is an angular direction of the fast axis of the quarter-wave plate configured for the fourth measurement.

When a PSG and PSA system includes one fixed polarizing plate and two full-wave retardation phase modulation devices, an optimal four-point measurement configuration of the PSG and the PSA satisfies the following relationship:

$$\begin{cases}\theta_{F1} = 45^\circ \\ \theta_{F2} = 0^\circ\end{cases}$$

-continued $$\begin{cases}\delta_{F1}' = 180^\circ + \delta_{F1} \\ \delta_{F2}' = 180^\circ - \delta_{F2}\end{cases}$$

$$\begin{cases}\delta_{F1}'' = 360^\circ - \delta_{F1} \\ \delta_{F2}'' = \delta_{F2}\end{cases}$$

$$\begin{cases}\delta_{F1}''' = 180^\circ - \delta_{F1} \\ \delta_{F2}''' = 180^\circ - \delta_{F2}\end{cases}$$

in the formula, $\delta_{F1}$ is a phase retardation of a first full-wave retardation phase modulation device configured for a first measurement, $\theta_{F1}$ is a fast axis angle thereof, $\delta_{F2}$ is a phase retardation of a second full-wave retardation phase modulation device configured for the first measurement, $\theta_{F2}$ is a fast axis angle thereof, $\delta_{F1}'$ is a phase retardation of the first full-wave retardation phase modulation device configured for a second measurement, $\delta_{F2}'$ is a phase retardation of the second full-wave retardation phase modulation device configured for the second measurement, $\delta_{F1}'$ is a phase retardation of the first full-wave retardation phase modulation device configured for a third measurement, $\delta_{F2}''$ is a phase retardation of the second full-wave retardation phase modulation device configured for the third measurement, $\delta_{F1}'''$ is a phase retardation of the first full-wave retardation phase modulation device configured for a fourth measurement, and $\delta_{F2}'''$ is a phase retardation of the second full-wave retardation phase modulation device configured for the fourth measurement.

When a PSG and PSA system includes one fixed polarizing plate and two half-wave retardation phase modulation devices, an optimal four-point measurement configuration of the PSG and the PSA satisfies the following relationship:

$$\begin{cases}\theta_P = -22.5^\circ \\ \theta_{H1} = 22.5^\circ \\ \theta_{H2} = 0^\circ\end{cases}$$

$$\begin{cases}\delta_{H1}' = 180^\circ - \delta_{H1} \\ \delta_{H2}' = 0^\circ\end{cases}$$

$$\begin{cases}\delta_{H1}'' = \delta_{H1} \\ \delta_{H2}'' = 180^\circ\end{cases}$$

$$\begin{cases}\delta_{H1}''' = 180^\circ - \delta_{H1} \\ \delta_{H2}''' = 180^\circ\end{cases}$$

in the formula, $\delta_{H1}$ and $\delta_{H2}$ are linear phase retardations of the two half-wave retardation phase modulation devices configured for a first measurement respectively, $\theta_{H1}$ and $\theta_{H2}$ are fast axis angles thereof respectively, $\delta_{H1}'$ and $\delta_{H2}'$ are linear phase retardations of the two half-wave retardation phase modulation devices configured for a second measurement respectively, $\delta_{H1}''$ and $\delta_{H2}''$ are linear phase retardations of the two half-wave retardation phase modulation devices configured for a third measurement respectively, while $\delta_{H1}'''$ and $\delta_{H2}'''$ are linear phase retardations of the two half-wave retardation phase modulation devices configured for a fourth measurement respectively.

Furthermore, polarization states represented by an actual configuration constitute an instrumental matrix, and a genetic algorithm or a similar optimization algorithm is used to perform minimum EWV optimization on the instrumental matrix, namely, one variable is set for each set, and remaining polarization states in one set which is able to be explicitly represented by the variable are obtained according to the variable; these polarization states then form one instrumental matrix with several unknown variables; the minimum EWV of the instrumental matrix is optimized via genetic algorithm, and what values the several unknown variables are when the EWV of the instrumental matrix is able to reach a minimum value may be calculated.

Further, both the PSG and PSA satisfy modulation of the full polarization state.

The present disclosure further provides a polarizing and analyzing system, including one rotating polarizing plate and one rotating quarter-wave plate, which are configured as follows: number of parameters actual configuration

| number of collection points | parameters | actual configuration |
|---|---|---|
| 4 | $\theta_P$ | 4.87°, 85.13°, 94.87°, 175.13° |
| | $\theta_Q$ | 22.50°, 67.50°, 112.50°, 157.50° |
| 4 | $\theta_P$ | 130.13°, 139.87°, 40.13°, 49.87° |
| | $\theta_Q$ | 112.50°, 157.50°, 22.50°, 67.50° |
| 8 | $\theta_P$ | 19.27°, 109.27°, 163.89°, 73.89° |
| | $\theta_Q$ | 180.00°, 180.00°, 179.88°, 179.88° |

it is configured such that a sum of each row of an instrumental matrix W of a PSG and an instrumental matrix A of an PSA is zero, and an EWV of the instrument matrices of the PSG and the PSA is optimal, so as to optimize a performance of a Müller measurement system against Gaussian-Poisson mixed noise.

The present disclosure further discloses a polarizing and polarizing system, including one fixed polarizing plate, one rotating half-wave plate and one rotating quarter-wave plate, which are configured as follows:

| number of collection points | parameters | actual configuration |
|---|---|---|
| 4 | $\theta_P$ | 0° |
| | $\theta_H$ | 2.433°, 42.567°, 137.433°, 87.567° |
| | $\theta_Q$ | 22.50°, 67.50°, 112.50°, 157.50° |
| 4 | $\theta_P$ | 0° |
| | $\theta_H$ | 47.433°, 177.567°, 2.433°, 42.567° |
| | $\theta_Q$ | 22.50°, 67.50°, 112.50°, 157.50° |
| 8 | $\theta_P$ | 0° |
| | $\theta_H$ | 171.46°, 36.46°, 0.33°, 45.44° |
| | $\theta_Q$ | 155.71°, 155.71°, 8.14°, 8.14° |

it is configured such that a sum of each row of an instrumental matrix W of a PSG and an instrumental matrix A of an PSA is zero, and an EWV of the instrument matrices of the PSG and the PSA is optimal, so as to optimize a performance of a Müller measurement system against Gaussian-Poisson mixed noise.

The present disclosure further discloses a polarizing and analyzing system, including one fixed polarizing plate and two full-wave retardation phase modulation devices, which are configured as follows:

| number of collection points | parameters | actual configuration |
|---|---|---|
| 4 | $\theta_P$ | 0° |
| | $\theta_{F1}$ | 45° |
| | $\theta_{F2}$ | 0° |
| | $\delta_{F1}$ | 305.26°, 234.74°, 125.26°, 54.74° |
| | $\delta_{F2}$ | 225.00°, 315.00°, 315.00°, 225.00° |
| 4 | $\theta_P$ | 0° |
| | $\theta_{F1}$ | 45° |
| | $\theta_{F2}$ | 0° |
| | $\delta_{F1}$ | 234.74°, 305.26°, 54.74°, 125.26° |
| | $\delta_{F2}$ | 45.00°, 135.00°, 135.00°, 45.00° |
| 8 | $\theta_P$ | 0° |
| | $\theta_{F1}$ | 45° |
| | $\theta_{F2}$ | 0° |
| | $\delta_{F1}$ | 105.04°, 285.04°, 292.52°, 112.52° |
| | $\delta_{F2}$ | 185.96°, 185.96°, 66.94°, 66.94° |

it is configured such that a sum of each row of an instrumental matrix W of a PSG and an instrumental matrix A of an PSA is zero, and an EWV of the instrument matrices of the PSG and the PSA is optimal, so as to optimize a performance of a Müller measurement system against Gaussian-Poisson mixed noise.

The present disclosure further discloses a polarizing and analyzing system, including one fixed polarizing plate and two half-wave retardation phase modulation devices, which are configured as follows:

| number of collection points | parameters | actual configuration |
|---|---|---|
| 4 | $\theta_P$ | 22.5° |
| | $\theta_{H1}$ | 67.5° |
| | $\theta_{H2}$ | 90° |
| | $\delta_{H1}$ | 35.26°, 144.74°, 144.74°, 35.26° |
| | $\delta_{H2}$ | 0°, 180°, 0°, 180° |
| 4 | $\theta_P$ | −22.5° |
| | $\theta_{H1}$ | 22.5° |
| | $\theta_{H2}$ | 45° |
| | $\delta_{H1}$ | 35.26°, 144.74°, 144.74°, 35.26° |
| | $\delta_{H2}$ | 0°, 180°, 0°, 180° |

it is configured such that a sum of each row of an instrumental matrix W of a PSG and an instrumental matrix A of an PSA is zero, and an EWV of the instrument matrices of the PSG and the PSA is optimal, so as to optimize a performance of a Müller measurement system against Gaussian-Poisson mixed noise.

The present disclosure further discloses a PSG capable of achieving arbitrary polarization state modulation, including: an illumination system, a rotatable polarizing plate, and a rotatable quarter-wave plate, wherein the illumination system is configured to generate incident light; the incident light is modulated to a desired polarized light by a combination of different rotation angles of the polarizing plate and the quarter-wave plate.

In some embodiment, the method further includes the following technical solution that: the polarizing plate and the quarter-wave plate are respectively driven to rotate by a corresponding electric precision rotary displacement stage.

By changing the orientation of the polarizing plate and rotating the quarter-wave plate for one revolution at each orientation, arbitrary polarization state modulation is achieved.

The present disclosure further discloses a method for optimizing a PSG, which is the above-mentioned PSG capable of polarization state modulation, the optimization method including:

taking the orientation of the polarizing plate and the fast axis angle of the quarter-wave plate as optimization objectives, and solving an optimal uniform distribution state of the corresponding polarization state on the Poincaré sphere by an iterative method of potential minimum, which satisfies the conditions of an optimal condition number.

Further, the method solving an optimal uniform distribution state of the corresponding polarization state on the Poincaré sphere by an iterative method of potential minimum includes:

calculating a Stokes vector of a polarization state generated by each modulation using an orientation of the polarizing plate and a fast axis angle of the quarter-wave plate, and mapping the calculated Stokes vector onto Poincaré sphere to display a corresponding position of a corresponding polarization state on the Poincaré sphere; then, uniformly distributing and optimizing the corresponding positions of each polarization state on the Poincare sphere to find an optimal PSG instrumental matrix configuration, which satisfies a minimum condition number index.

Further, the uniformly distributing and optimizing the corresponding positions of each polarization state on the Poincaré sphere to find an optimal PSG instrumental matrix configuration includes: regarding the corresponding position point of the polarization state corresponding to each pair of rotation angles on the Poincare sphere as a point charge, taking a minimum potential energy between the point charges as a search target, and using a global search algorithm to take an orientation of the polarizing plate and the fast axis angle of the quarter-wave plate corresponding to a minimum total potential energy as an optimal configuration, wherein the optimal configuration corresponds to a PSG instrumental matrix configuration under the minimum condition number, wherein the pair of the rotation angles include the orientation of the polarizing plate in one modulation and the fast axis angle of the quarter-wave plate.

Further, the total potential energy is calculated as:

$$E = \frac{1}{2}\sum_{i=1}^{N}\sum_{j\neq i}\frac{1}{|r_i - r_j|}$$

wherein N represents that the PSG is modulated N times, N≥4; the N polarization states of the N times of modulation correspond to the N position points on the Poincaré sphere, namely, corresponding to N point charges; E represents a total potential energy of N point charges; $r_i$ and $r_j$ represent a position vector of an ith point charge with respect to a center of the Poincaré sphere and a position vector of a jth point charge with respect to a center of the Poincaré sphere respectively.

The advantages of the present disclosure over the prior art include that: the PSG and PSA configuration optimization method provided by the present disclosure minimizes the equal-weighted variance EWV of the instrument matrices of the PSG and the PSA by adjusting the instrumental matrix W of the PSG and the instrumental matrix A of the PSA, so as to realize the optimization for Gaussian noise, and a sum of each row of the instrumental matrix W of the PSG and the instrumental matrix A of the PSA is zero, so that the estimated variance caused by Poisson noise is independent of the sample, and the estimated variance reaches the minimum value, so as to realize the maximum suppression of noise, and make the noise law independent of the sample, and the noise distribution law is the same regardless of the sample to be measured.

In some embodiments, the present disclosure combines the measurement configuration with the optimization of Gaussian-Poisson mixed noise to further improve the performance accuracy in polarization measurements, particularly in Müller matrix measurements, by minimizing the weighted variance EWV of the instrument matrices of the PSG and PSA by employing an optimal measurement configuration of the PSG and PSA for a variety of different devices, to minimize the error propagation effects in the Müller matrix measurements, and to make the Poisson noise performance sample independent. At the same time, this method has universality and can be optimized for various measurement systems with different structures.

DETAILED DESCRIPTION OF THE INVENTION

Figure 1A:
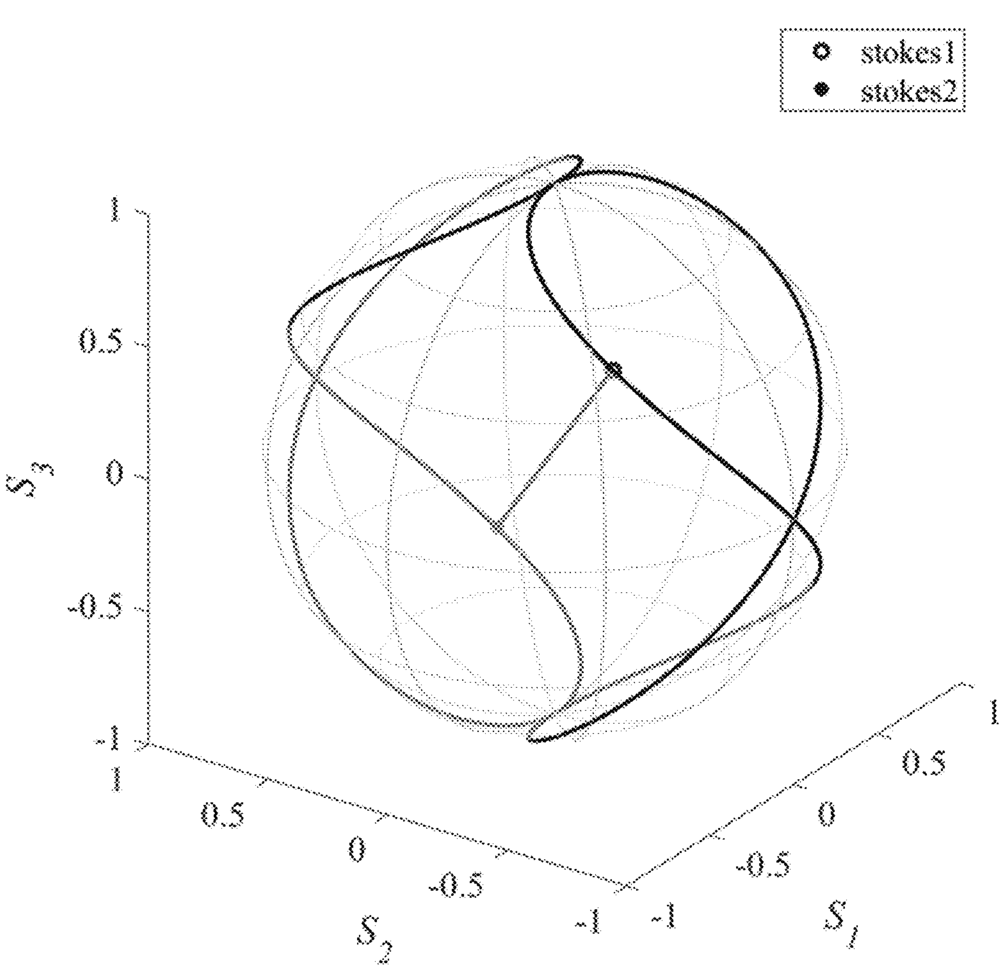
FIGS. 1*a* to 1*b* are a set of orthogonal polarization state diagrams formed by a rotating phase retardation device in an embodiment of the present disclosure.

The present disclosure is further illustrated in combination with the drawings in combination with preferred embodiments. It should be noted that the embodiments and features in the embodiments in the present disclosure can be combined with each other without conflict.

It should be noted that the terms left, right, up, down, top, bottom and the like in the present embodiment are merely relative to each other or refer to the normal use state of the product, and should not be considered as limiting.

Embodiment 1

It is found that the performance of Müller matrix measurement system can be greatly improved by selecting incident polarization states generated by a PSG (instrumental matrix W of the PSG) and several polarization states projection channels of PSA an (instrumental matrix A of the PSA). Therefore, the optimization of the embodiment of the present disclosure is to select more appropriate W and A. The instrument matrices W and A are optimized under what conditions is given by the following derivation:

Gaussian-Poisson mixed noise often exists in Müller matrix measurement system, and covariance analysis is needed to evaluate the influence of noise on estimated variance of Müller matrix. In the Müller matrix measurement system, the relationship between the light intensity directly measured and the instrumental matrix and the sample Müller matrix can be expressed as:

$$I=A^TMW$$

where I is a light intensity image measured by CCD, M is the Müller matrix of the sample, W and A represent the instrumental matrices of the PSG and PSA, respectively, and T represents a transposed form of the matrix. To facilitate the calculation, the light intensity matrix and the Müller matrix of the sample are expanded into a vector form by means of the Kronecker product:

$$V_I=[A\otimes]^TV_M$$

$$V_M=\{[A\otimes W]^T\}^{-1}V_I$$

where $V_I$ and $V_M$ are in the form of a column vector of the above-mentioned light intensity matrix 1 and the Müller matrix M of the sample, respectively, and −1 represents an inverse or pseudo-inverse of the matrix. According to the relationship between $V_M$ and $V_I$, the relationship between its covariance matrices can be defined as:

$$\Gamma_{V_M}=[A^{-1}\otimes W^{-1}]^T\Gamma_{V_I}[A^{-1}\otimes W^{-1}]$$

where ⊗ represents the Kronecker integral, $\otimes_{V_M}$ and $\otimes V_I$ represent a covariance matrix associated with the column vector $V_M$ of the sample Müller matrix and the column vector $V_I$ of the light intensity matrix, respectively. The correct performance criterion for the Müller matrix measurement system is a sum of variances of all elements of the Müller matrix, i.e. the trace of $\otimes_{V_M}$:

$$C=\text{trace}\{\otimes_{V_M}\}$$

where trace( ) represents tracing the matrix. When additive Gaussian noise exists in the system, the covariance matrix $\otimes_{V_I}$ of intensity noise is expressed as a diagonal matrix with its variance $\sigma^2$ as the diagonal elements. It can be seen therefrom that the estimated variance caused by the Gaussian noise in the system on the Müller matrix is:

$$\begin{aligned}C_{Gaussian} &= \sigma^2\ \text{trace}\left([A^{-1}\otimes W^{-1}][A^{-1}\otimes W^{-1}]^T\right)\\ &= \sigma^2\ \text{trace}(Q_A)\text{trace}(Q_W)\\ &= \sigma^2 EWV_A EWV_W\end{aligned}$$

where $Q_A=(A^TA)^{-1}$ $Q_W=(W^TW)^{-1}$ (this is a shorthand form of calculation), and $EWV_W$ and $EWV_A$ represent the equal-weighted variances of the instrument matrices of the PSG and PSA, respectively. It can be seen from the above-mentioned formula that, for the optimization of Gaussian noise, only the equal-weighted variance (EWV) of the instrument matrices of the PSG and PSA is minimum, the optimal state can be achieved.

When there is additive Gaussian noise in the system, the covariance matrix $\otimes_{V_I}$ of intensity noise needs to rely on the property of Poisson distribution, and its variance is given by a mean of the light intensity matrix I. In this case, the diagonal elements of $\otimes_{V_I}$ should be expressed as:

$$[\Gamma_{V_I}]_{i,i}=\sum_{k=1}^{16}[A\otimes W]^T_{i,k}[V_M]_k$$

where $[V_M]_k$ represents a kth element in the column vector $V_M$, i and k are both coordinate indices of the matrix, $$[\Gamma_{V_I}]_{i,i}$$

represents a value of an ith row and an ith column of the matrix $\otimes_{V_I}$, and $$[A\otimes W]^T_{i,k}$$

represents a value of an ith row and a kth column of a transposed matrix of A⊗W Using covariance analysis, an estimated variance of the Müller matrix due to Poisson noise in the system is:

$$\begin{aligned}C_{Poission} &= \sum_{k=1}^{16}[V_M]_k\left[\sum_{i=1}^{8\times N}[Q_A\otimes Q_W]_{i,i}[A\otimes W]^T_{i,k}\right]\\ &= \frac{1}{4}[V_M]_l\sum_{i=1}^{8\times N}[Q_A\otimes Q_W]_{i,i}+\\ &\sum_{k=2}^{16}[V_M]_k\left[\sum_{i=1}^{8\times N}[Q_A\otimes Q_W]_{i,i}[A\otimes W]^T_{i,k}\right]\end{aligned}$$

The first term of $V_M$ after normalization is always 1. Obviously, in the above-mentioned formula, the first term is independent of the sample, while the second term is associated with the last 15 elements of the sample, resulting in a change in the estimated variance due to Poisson noise as the sample changes. Fortunately, $[Q_A\otimes Q_W]_{i,j}$ is a constant when the EWV of the instrument matrices of the PSG and PSA is optimal. Thus, the second term of CPoission is zeroed such that the estimated variance of the Müller matrix due to Poisson noise is independent of the sample when the following formula is satisfied:

$$\forall\ k\in[2,16],\ \sum_{i=1}^{8\times N}[A\otimes W]^T_{i,k}=0$$

The equivalent conditions of the above-mentioned formula are: a sum of each row of the instrumental matrix W of the PSG and the instrumental matrix A of the PSA is zero. When this condition is satisfied and the EWV of the instrument matrices of the PSG and PSA is optimal, the estimated variance due to Poisson noise is independent of the sample and the estimated variance reaches the minimum value. The optimized CPoission at this point can be expressed as:

$$C_{Poission\_Opt} = \frac{1}{4}\sum_{i=1}^{8\times N}[Q_A \otimes Q_W]_{i,i} = \frac{1}{4}EWV_A EWV_W$$

In summary, when the sum of each row of the instrumental matrix W of the PSG and the instrumental matrix A of the PSA is 0, and the EWV of the instrument matrices of the PSG and the PSA is optimal, the performance of the Müller matrix measurement system against Gaussian-Poisson mixed noise is optimal, and the estimated variance of the system population can be expressed as:

$$C_{Optimal} = \left(\frac{1}{4} + \sigma^2\right)EWV_A EWV_W$$

To this end, we have learned in which case the instrument matrices W and A are optimal. However, there is no direct connection between the instrumental matrix and the actual measurement system at this time, but the instrumental matrix is optimal under what conditions is obtained. If the actual measurement system is to be optimized, even if the instrumental matrix of the measurement system satisfies the above-mentioned conditions, further optimization is required. Since this step of optimization is to link actual measurement with theory, we will present the method and process of optimization by taking several actual measurement systems as examples.

Figure 1B:
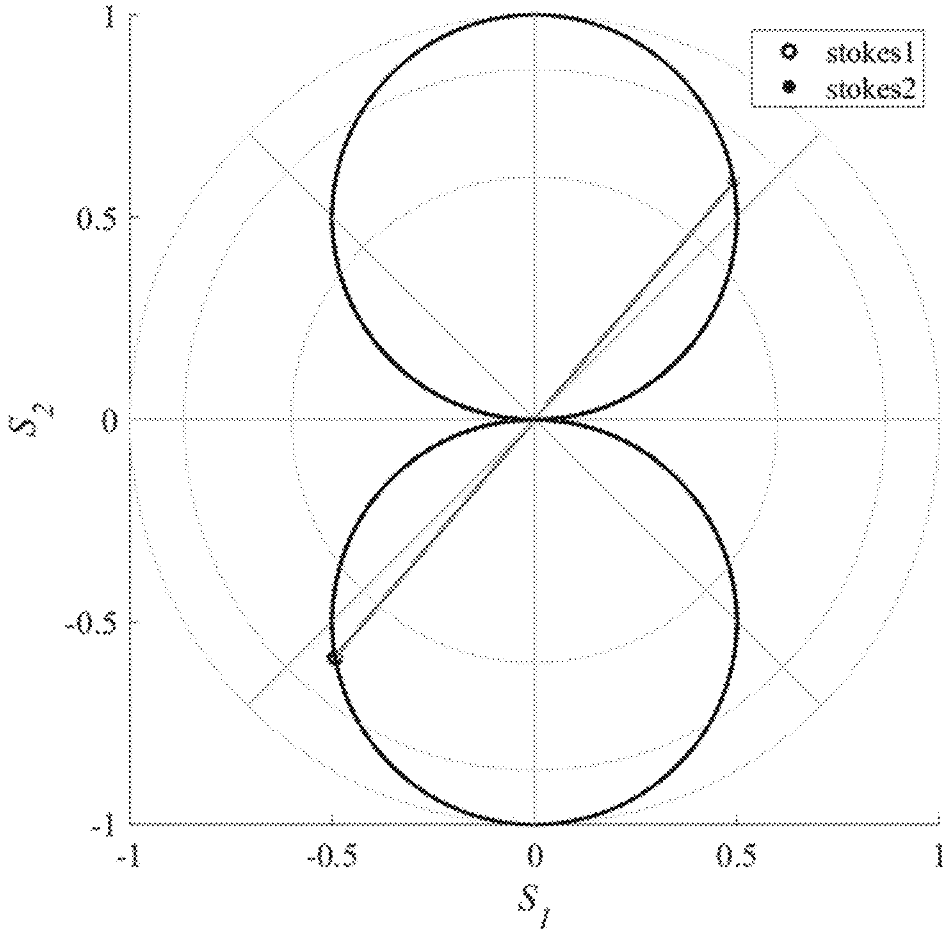
Figure 2A:
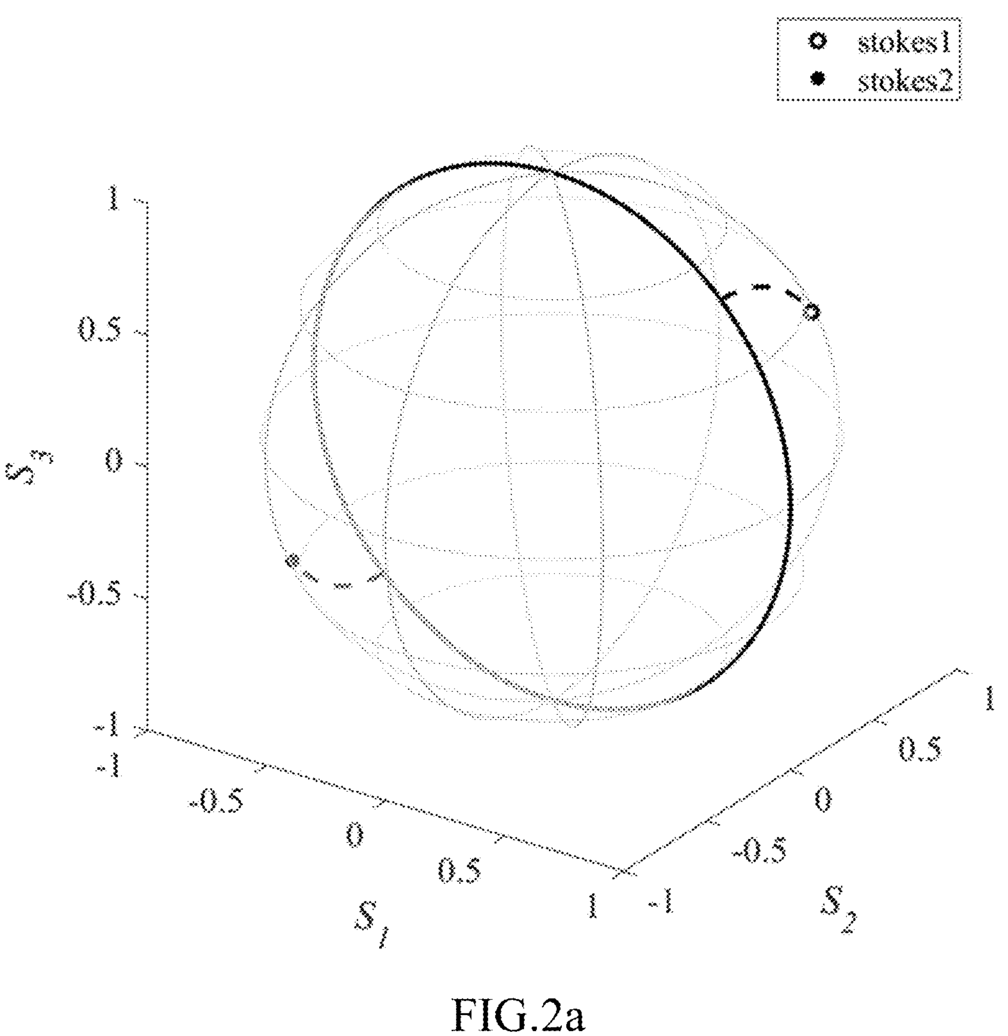
FIGS. 2*a* to 2*b* are a set of orthogonal polarization state diagrams formed by a phase variable retardation device in an embodiment of the present disclosure.
Figure 2B:
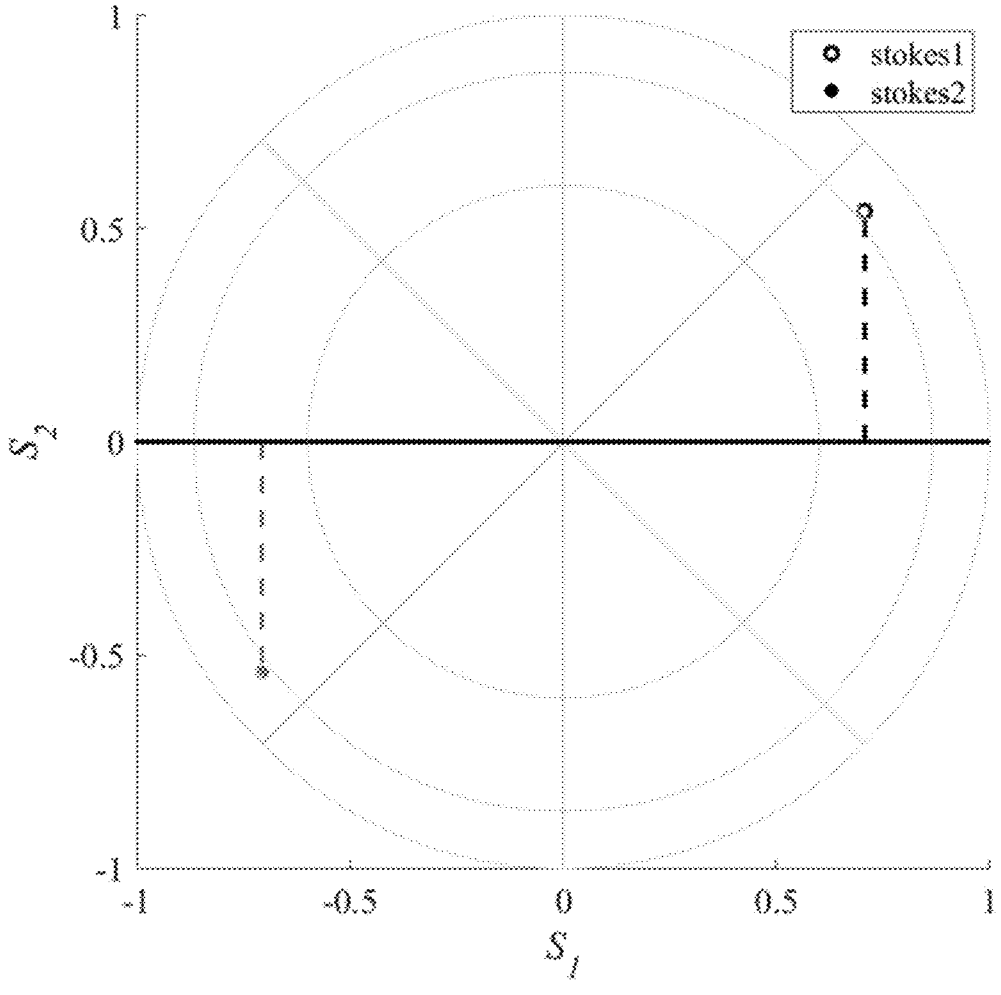

Considering the different characteristics of rotary and phase-variable retarders, the rotary device is driven by a high-precision rotary motor, and the overall measurement error is small, but the measurement is generally time-consuming due to the slow response speed of moving parts. However, due to the influence of temperature drift, the accuracy of electrically controlled phase retardation variable retarder is slightly worse, but the response speed is in the order of milliseconds, so it can achieve very fast measurement, but the cost is also high. Therefore, they will not be mixed, and we optimize the system composed of these two types of phase retardation devices separately. A set of orthogonal polarization states formed by a rotating phase retardation device is shown in FIGS. 1*a* to 1*b*, and a set of orthogonal polarization states formed by a phase variable retardation device is shown in FIGS. 2*a* to 2*b*.

Embodiments of the present disclosure further improve performance accuracy in polarization measurements, particularly Müller matrix measurements, by employing optimal configurations of PSGs and PSAs with a variety of different devices. An optimal configuration is achieved that minimizes the effects of error propagation in the Müller matrix measurements and makes the Poisson noise appear independent of the sample.

As mentioned above, when the sum of each row of the instrumental matrix W of the PSG and the instrumental matrix A of the PSA is 0, and the EWV of the instrumental matrix of the PSG and the PSA is optimal, the performance of the Müller matrix measurement system against Gaussian-Poisson mixed noise is optimal. Thus, if W and A of the measurement system are made to satisfy this condition, it is natural to optimize the measurement system, achieve minimal noise transfer and be Poisson noise sample independent. However, W and A of the measurement system are determined by the polarization states generated by the PSG and PSA of the measurement system, and what polarization state is generated is determined by the configuration of the measurement system (fast axis angle, phase retardation, etc. of each element). Thus, the problem of optimizing W and A translates into an optimization problem of the measurement system configuration.

Obviously, when the polarization states of the instrumental matrix are mutually orthogonal, the last three components of the Stokes vectors of the two orthogonal polarization states are an opposite number of one another, and the row sum of the whole instrumental matrix is naturally zero, i.e. the first requirement of the optimal instrumental matrix is satisfied. In Poincaré sphere, two polarization states that are symmetric about the center of the circle are a set of orthogonal polarization states. While the instrumental matrix itself is composed of multiple polarization states, the N polarization states of the instrumental matrix can form a polyhedron on the Poincaré sphere. If any vertex of the polyhedron has a vertex that is symmetrical about the center of the circle, then each polarization state also has one corresponding orthogonal polarization state. The key to this problem is how to configure the PSG and PSA of the measurement system so that their polarization states are orthogonal. And according to the Müller matrix $M_{\delta,\theta}$ of the phase retardation device:

$$\begin{bmatrix} 1 & 0 & 0 & 0 \\ 0 & \cos^2 2\theta + \sin^2 2\theta\cos\delta & \sin 2\theta\cos 2\theta(1-\cos\delta) & -\sin 2\theta\sin\delta \\ 0 & \sin 2\theta\cos 2\theta(1-\cos\delta) & \sin^2 2\theta + \cos^2 2\theta\cos\delta & \cos 2\theta\sin\delta \\ 0 & \sin 2\theta\sin\delta & -\cos 2\theta\sin\delta & \cos\delta \end{bmatrix}$$

It can be seen that although we can easily calculate the polarization state of the emergent light after any polarized light passes through the phase retardation device, when we perform polarization state modulation, we pay more attention to what fast axis angle and phase retardation relationship can satisfy to modulate the incident light to the target polarization state. However, in this case, the conventional forward thinking cannot achieve our requirements, and it is often necessary to take the fast axis angle and phase retardation as the input, and obtain the corresponding output polarization state by continuously adjusting the input, rather than designing a phase retardation device which can meet the requirements according to the required polarization state.

Thus, embodiments of the present disclosure will first consider the effect of the nature of the phase retardation device on the change in polarization state from an intuitive, rather than an algebraic, perspective. The law can be summarized as:

- when the phase retardation device changes the linear phase retardation at a fixed fast axis angle, a trajectory of the change of polarization state on the Poincaré sphere will be projected as a straight line on the $S_1$ and $S_2$ planes;
- the fast axis angle of the phase retardation device determines a direction of a straight line of a projection of the trajectory on the $S_1$ and $S_2$ planes as the polarization state changes with different phase retardations on the Poincaré sphere. The relationship of 20=φ is satisfied by the fast axis angle θ and the included angle φ between the projection and the $S_2$ direction; When the fixed fast axis angle of the phase retardation device changes the linear phase retardation, a circular arc is formed by the trajectory of the change of the polarization state on the Banghal sphere. When the linear phase retardation changes from 0 to 2r, the circular arc will become a complete circle. At the same time, the direction of the circular arc is from the incident polarization state to make an arc at an included angle (p from the direction $S_2$ (when $S_3$<0, at a reverse direction).

The phase retardation device is further embodied as a wave plate with fixed phase retardation and an electrically controlled element with variable phase retardation (here, a liquid crystal variable phase retarder (LCVR) is taken as an example). The wave plate is characterized by a relatively simple structure, which can be conveniently combined with a rotating motor to change the fast axis angle without the need of a matched control device, but the phase retardation of the wave plate cannot be changed freely, which is usually a fixed value determined by the material of the wave plate itself. The characteristic of LCVR is just contrary to the wave plate, which has complex controller and circuit limitation and is unable to cooperate with moving parts in use, so its fast axis angle is usually not changed after the optical path is built, but its phase retardation can be easily controlled by voltage, and its response speed is much faster than the motor rotation due to electronic control.

Combining the characteristics of wave plate and LCVR, we can find that the LCVR device is more suitable for the modulation of polarization state by artificially changing the phase retardation as required after determining a fast axis angle in practical use. While the wave plate is a fixed phase retardation, it is difficult to achieve a desired polarization state by controlling the fast axis angle through a motor when the modulation of polarization state is performed. Meanwhile, due to the advantages in accuracy of the wave plate (rotating device) and the advantages in response speed of the LCVR, it is not always possible to mix the two. Considering different costs and system requirements at the same time, we take the following measurement optical paths with different structures as an example, and give what kind of relationship is satisfied for the configuration of each element (polarizing plate, angle of wave plate, phase retardation of electrically controlled phase variable retarder) when two times of measurement are made, so that the two polarization states generated can be orthogonal:

One rotating polarizing plate and one rotating quarter-wave plate.

$$\begin{cases} \theta_P' = \theta_P + 90^\circ \\ \theta_R' = \theta_R + 90^\circ + 90^\circ = \theta_R \end{cases}$$

Figure 3:
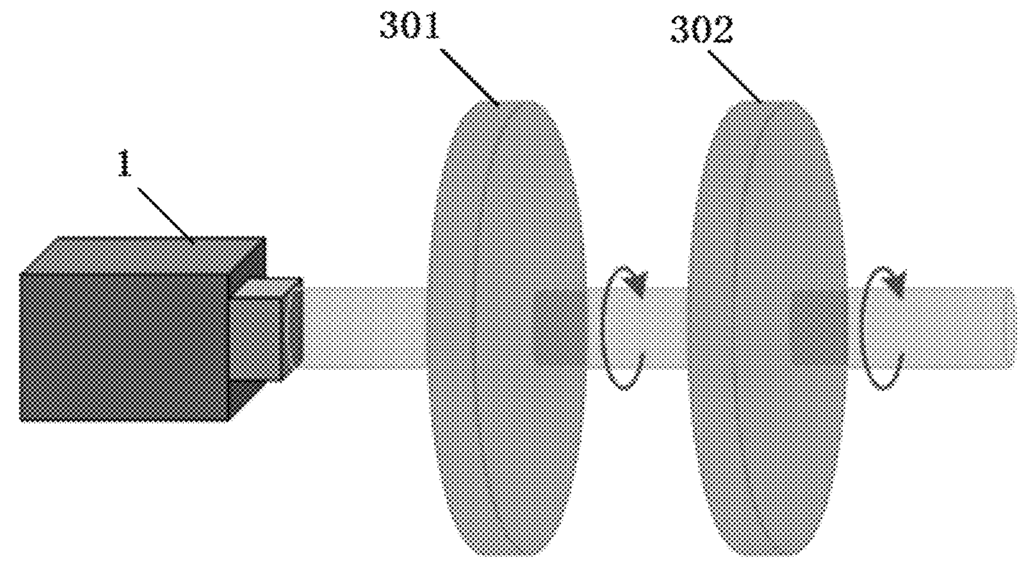
FIG. 3 is a schematic diagram of an instrument of one rotating polarizing plate and one rotating quarter-wave plate in an embodiment of the present disclosure.

In the formula, $\theta_P$ is a direction of the light transmission axis of the polarizing plate configured for a first measurement, $\theta_R$ is an angular direction of a fast axis of the quarter-wave plate configured for the first measurement, $\theta_P'$ is a direction of the light transmission axis of the polarizing plate configured for a second measurement, and $\theta_R'$ is an angular direction of a fast axis of the quarter-wave plate configured for the second measurement, This structure adjusts the main light passing direction of polarization mainly through the polarizing plate, and then realizes the modulation of specific polarization state through quarter-wave plate. FIG. 3 is a schematic diagram of an instrument of one rotating polarizing plate 301 and one rotating quarter-wave plate 302.

One fixed polarizing plate, one rotating half-wave plate and one rotating quarter-wave plate.

$$\begin{cases} \theta_H' = \theta_H + 45^\circ \\ \theta_R' = \theta_R + 90^\circ + 90^\circ = \theta_R \end{cases}$$

in the formula, $\theta_H$ is an angular direction of a fast axis of the half-wave plate configured for a first measurement, $\theta_R$ is an angular direction of a fast axis of the quarter-wave plate configured for the first measurement, $\theta_H'$ is an angular direction of the fast axis of the half-wave plate configured for a second measurement, and $\theta_R'$ is an angular direction of the fast axis of the quarter-wave plate configured for the second measurement.

Figure 4:
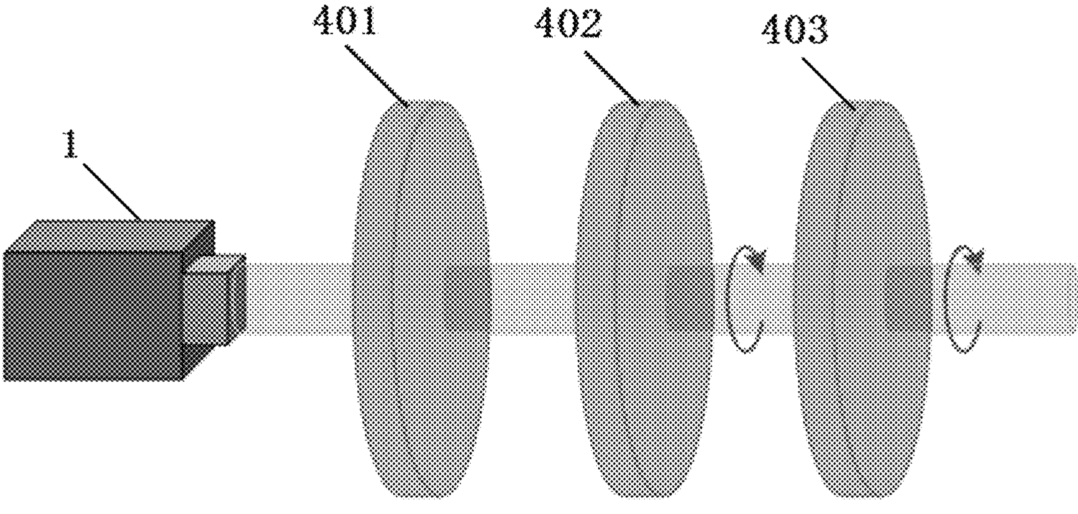
FIG. 4 is a schematic diagram of an instrument of one fixed polarizing plate, one rotating half-wave plate and one rotating quarter-wave plate in an embodiment of the present disclosure.

This configuration is similar to the previous configuration, but a modulation of a direction of linearly polarized light in the method changes from a single polarizing plate modulation to a fixed polarizing plate plus a half-wave plate, which is able to avoid inconsistency of light intensity of the linearly polarized light in different directions caused by rotating the polarizing plate when incident light is not ideal natural light. FIG. 4 is a schematic diagram of an instrument of one fixed polarizing plate 401, one rotating half-wave plate 402 and one rotating quarter-wave plate 403.

Figure 5:
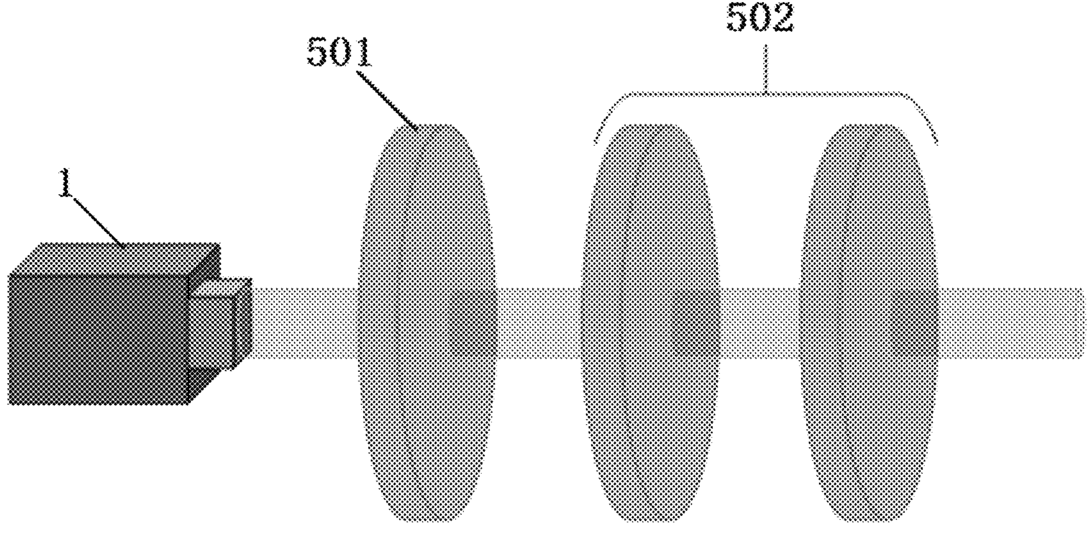
FIG. 5 is a schematic diagram of an instrument of one fixed polarizing plate and two full-wave retardation phase modulation devices in an embodiment of the present disclosure.

One fixed polarizing plate and two full-wave retardation phase modulation devices.

$$\begin{cases} \theta_P = 0^\circ \\ \theta_{F1} = 45^\circ \\ \theta_{F2} = 0^\circ \end{cases}$$

$$\begin{cases} \delta_{F1}' = 180^\circ + \delta_{F1} \\ \delta_{F2}' = \delta_{F2} \end{cases}$$

in the formula, $\delta_{F1}$ is a phase retardation of a first full-wave retardation phase modulation device configured for a first measurement, $\theta_{F1}$ is a fast axis angle thereof, $\delta_{F2}$ is a phase retardation of a second full-wave retardation phase modulation device configured for the first measurement, $\delta_{F2}$ is a fast axis angle thereof, $\delta_{F1}'$ is a phase retardation of the first full-wave retardation phase modulation device configured for a second measurement, and $\delta_{F2}'$ is a phase retardation of the second full-wave retardation phase modulation device configured for the second measurement. The structure first modulates the polarization state on a circle of a $S_1OS_3$ plane on Poincaré sphere via the first full-wave retardation phase modulation device, and then obtains a target polarization state via the second full-wave retardation phase modulation device. FIG. 5 is a schematic diagram of an instrument of one fixed polarizing plate 501 and two full-wave retardation phase modulation devices 502.

When the two measurement configurations satisfy the above-mentioned relationship, the emergent polarization state has a symmetric relationship on the Poincaré sphere, and $S_1$, $S_2$, and $S_3$ of the components of the two times of measurement are zero respectively, and the first condition of the optimal instrumental matrix can be satisfied.

However, since the four polarization states modulated by this method are orthogonal with one another in four times of measurement, the two sets of four polarization states modulated by this method will form an instrumental matrix with an infinite condition number, so that the Müller matrix has no solution. Therefore, the pair-wise orthogonal relationship is valid only for instrument matrices with no less than four points and even number of times of measurement. Four points have only two optimal instrument matrices:

$$\begin{bmatrix} 1 & 1 & 1 & 1 \\ 1/\sqrt{3} & -1/\sqrt{3} & -1/\sqrt{3} & 1/\sqrt{3} \\ 1/\sqrt{3} & 1/\sqrt{3} & -1/\sqrt{3} & -1/\sqrt{3} \\ 1/\sqrt{3} & -1/\sqrt{3} & 1/\sqrt{3} & -1/\sqrt{3} \end{bmatrix}$$

$$\begin{bmatrix} 1 & 1 & 1 & 1 \\ -1/\sqrt{3} & 1/\sqrt{3} & 1/\sqrt{3} & -1/\sqrt{3} \\ -1/\sqrt{3} & -1/\sqrt{3} & 1/\sqrt{3} & 1/\sqrt{3} \\ -1/\sqrt{3} & 1/\sqrt{3} & -1/\sqrt{3} & 1/\sqrt{3} \end{bmatrix}$$

These two instrument matrices form exactly one regular tetrahedron on the Poincaré sphere, and all the three views are square. When the row sum is limited to zero, the pair-wise orthogonal way will no longer be adopted, but limitation is made through the characteristics of regular tetrahedron. The three views of the regular tetrahedron are square, so if the three views are constrained, the four polarization states generated by the measurement system can form a four-point measurement on the Poincaré sphere, which is rectangular in three views. Compared with the multi-point measurement, the four-point measurement has an absolute measurement speed advantage. The optimal measurement frame configuration under the four-point measurement is given here: one rotating polarizing plate and one rotating quarter-wave plate.

$$\begin{cases} \theta_P' = \theta_P + 90^\circ \\ \theta_R' = \theta_R + 90^\circ \end{cases}$$

$$\begin{cases} \theta_P'' = -\theta_P \\ \theta_R'' = -\theta_R \end{cases}$$

$$\begin{cases} \theta_P''' = 90^\circ - \theta_P \\ \theta_R''' = 90^\circ - \theta_R \end{cases}$$

in the formula, $\theta_P$ is a direction of a light transmission axis of the polarizing plate configured for a first measurement, $\theta_R$ is an angular direction of a fast axis of the quarter-wave plate configured for the first measurement, $\theta_P'$ is a direction of the light transmission axis of the polarizing plate configured for a second measurement, $\theta_R'$ is an angular direction of the fast axis of the quarter-wave plate configured for the second measurement, $\theta_P''$ is a direction of the light transmission axis of the polarizing plate configured for a third measurement, $\theta_R''$ is an angular direction of the fast axis of the quarter-wave plate configured for the third measurement, $\theta_P'''$ is a direction of the light transmission axis of the polarizing plate configured for a fourth measurement, and $\theta_R'''$ is an angular direction of the fast axis of the quarter-wave plate configured for the fourth measurement. When the configuration of four times of measurement satisfies the relationship given by this formula, the three views of the tetrahedron can be made rectangular.

One fixed polarizing plate, one rotating half-wave plate and one rotating quarter-wave plate.

$$\begin{cases} \theta_H' = \theta_H + 45^\circ \\ \theta_R' = \theta_R + 90^\circ \end{cases}$$

-continued $$\begin{cases} \theta_H'' = -\theta_H \\ \theta_R'' = -\theta_R \end{cases}$$

$$\begin{cases} \theta_H''' = 45^\circ - \theta_H \\ \theta_R''' = 90^\circ - \theta_R \end{cases}$$

in the formula, OH is an angular direction of a fast axis of the half-wave plate configured for a first measurement, $\theta_R$ is an angular direction of a fast axis of the quarter-wave plate configured for the first measurement, $\theta_H'$ is an angular direction of the fast axis of the half-wave plate configured for a second measurement, $\theta_R'$ is an angular direction of the fast axis of the quarter-wave plate configured for the second measurement, $\theta_H''$ is an angular direction of the fast axis of the half-wave plate configured for a third measurement, $\theta_R''$ is an angular direction of the fast axis of the quarter-wave plate configured for the third measurement, $\theta_H$ is an angular direction of the fast axis of the half-wave plate configured for a fourth measurement, and $\theta_R'''$ is an angular direction of the fast axis of the quarter-wave plate configured for the fourth measurement.

One fixed polarizing plate and two full-wave retardation phase modulation devices.

$$\begin{cases} \theta_{F1} = 45^\circ \\ \theta_{F2} = 0^\circ \end{cases}$$

$$\begin{cases} \delta_{F1}' = 180^\circ + \delta_{F1} \\ \delta_{F2}' = 180^\circ - \delta_{F2} \end{cases}$$

$$\begin{cases} \delta_{F1}'' = 360^\circ - \delta_{F1} \\ \delta_{F2}'' = \delta_{F2} \end{cases}$$

$$\begin{cases} \delta_{F1}''' = 180^\circ - \delta_{F1} \\ \delta_{F2}''' = 180^\circ - \delta_{F2} \end{cases}$$

in the formula, $\delta_{F1}$ is a phase retardation of a first full-wave retardation phase modulation device configured for a first measurement, $\theta_{F1}$ is a fast axis angle thereof, $\delta_{F2}$ is a phase retardation of a second full-wave retardation phase modulation device configured for the first measurement, $\theta_{F2}$ is a fast axis angle thereof, $\delta_{F1}'$ is a phase retardation of the first full-wave retardation phase modulation device configured for a second measurement, $\delta_{F2}'$ is a phase retardation of the second full-wave retardation phase modulation device configured for the second measurement, $\delta_{F1}''$ is a phase retardation of the first full-wave retardation phase modulation device configured for a third measurement, $\delta_{F2}''$ is a phase retardation of the second full-wave retardation phase modulation device configured for the third measurement, $\delta_{F1}'''$ is a phase retardation of the first full-wave retardation phase modulation device configured for a fourth measurement, and $\delta_{F2}'''$ is a phase retardation of the second full-wave retardation phase modulation device configured for the fourth measurement.

One fixed polarizing plate and two half-wave retardation phase modulation devices.

$$\begin{cases} \theta_P = -22.5^\circ \\ \theta_{H1} = 22.5^\circ \\ \theta_{H2} = 0^\circ \end{cases}$$

$$\begin{cases} \delta_{H1}' = 180^\circ - \delta_{H1} \\ \delta_{H2}' = 0^\circ \end{cases}$$

-continued $$\begin{cases} \delta''_{H1} = \delta_{H1} \\ \delta''_{H2} = 180° \end{cases}$$

$$\begin{cases} \delta'''_{H1} = 180° - \delta_{H1} \\ \delta'''_{H2} = 180° \end{cases}$$

in the formula, $\delta_{H1}$ and $\delta_{H2}$ are linear phase retardations of the two half-wave retardation phase modulation devices configured for a first measurement respectively, $\theta_{H1}$ and $\theta_{H2}$ are fast axis angles thereof respectively, $\delta_{H1}'$ and $\delta_{H2}'$ are linear phase retardations of the two half-wave retardation phase modulation devices configured for a second measurement respectively, $\delta_{H1}''$ and $\delta_{H2}''$ are linear phase retardations of the two half-wave retardation phase modulation devices configured for a third measurement respectively, while $\delta_{H1}'''$ and $\delta_{H2}'''$ are linear phase retardations of the two half-wave retardation phase modulation devices configured for a fourth measurement respectively.

Figure 6:
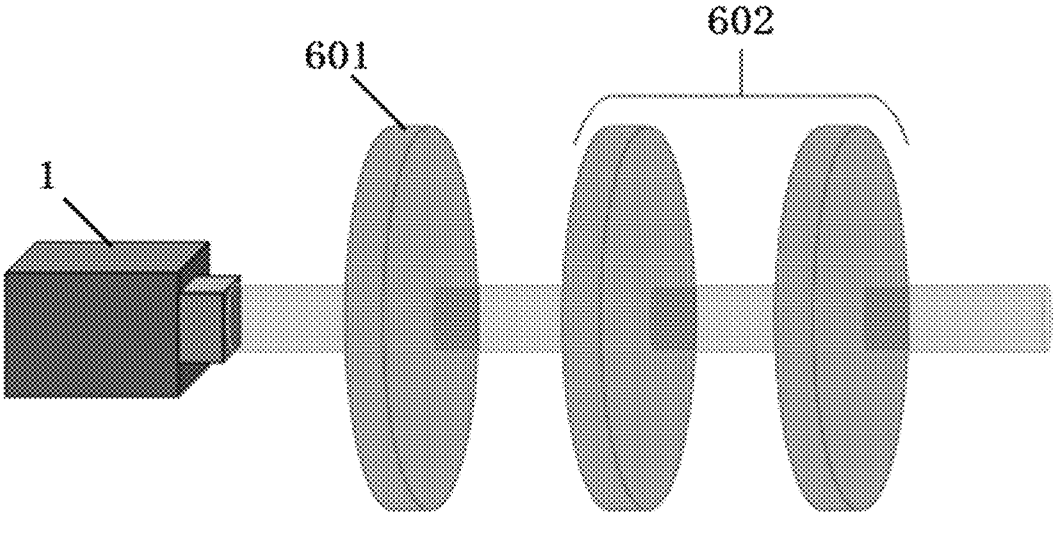
FIG. 6 is a schematic diagram of an instrument of one fixed polarizing plate and two half-wave retardation phase modulation devices in an embodiment of the present disclosure.
Figure 7A:
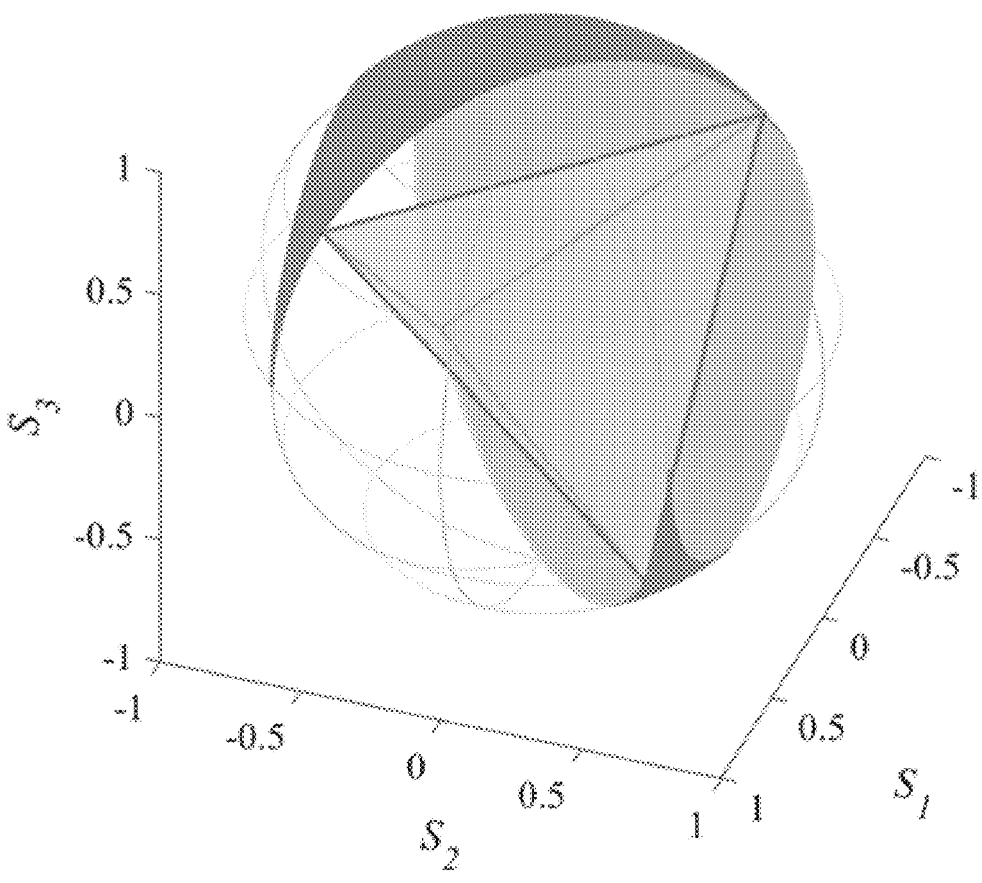
FIGS. 7*a*-7*b* are block diagrams of all polarization states and optimal four-point measurements that can be modulated by an instrument of one fixed polarizing plate and two half-wave retardation phase modulation devices in an embodiment of the present disclosure.
Figure 7B:
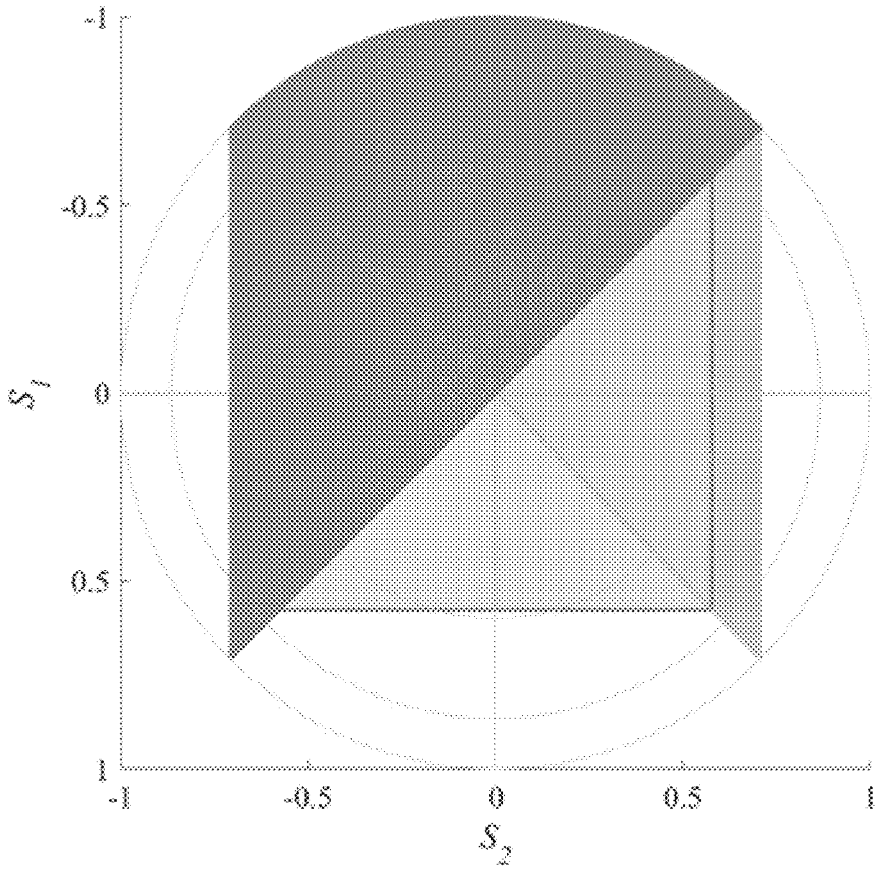

This configuration cannot satisfy the modulation of the full polarization state, but can satisfy the four-point optimal framework. FIG. 6 is a schematic diagram of an instrument of one fixed polarizing plate 601 and two half-wave retardation phase modulation devices 602, where all polarization states that can be modulated and the optimal four-point measurement frame is shown in FIGS. 7*a* to 7*b*, where the dark r-section is all polarization states that can be generated by a PSG/PSA with one polarizing plate at 22.5 degrees and two half-wave retardation phase modulation devices (67.5 degrees, 90 degrees). The polarization states that can be generated by such a structure cannot traverse the entire Poincaré sphere, but can just cover the four polarization states of the four-point theoretical optimal instrumental matrix (e.g. the four vertices of the light-colored regular tetrahedron).

When the above-mentioned conditions are satisfied, the degree of freedom of the four-point configuration can be reduced to one or two, which greatly reduces the difficulty of configuration optimization. With the help of this relationship, the actual configuration of the optimal framework can be quickly obtained.

With the above-mentioned constraints, the optimal configuration of Poisson noise independent of samples can be obtained for both four times of measurement and multiple times of measurement. At this point we obtain N/2 sets of orthogonal polarization states (N times of polarizations/analytics) or one set of 4 unknown polarization states (4 times of polarizations/analytics) that satisfy a certain relationship. However, only the relationship within each set is known, while the actual polarization state and configuration are still unknown. At this point we need to set up a series of variables for each set, and based on the variables, the remaining polarization states in the set that can be unambiguously represented by the variables. After that, these polarization states will constitute one instrumental matrix with several unknown variables, and the instrumental matrix itself can be considered to be composed of multiple polarization states, namely, if there are four Stokes vectors S1, S2, S3 and S4; then the instrumental matrix composed of these four column vectors is W=[S1 S2 S3 S4]. As to whether these four Stokes vectors are completely known or represented by unknown variables, the former can obtain a completely known instrumental matrix W, and the latter can obtain an instrumental matrix W represented by variables. The minimum EWV of the instrumental matrix is optimized by genetic algorithm, and what values these several unknown variables are when the EWV of the instrumental matrix can reach a minimum value can be calculated. At this time, the instrumental matrix and measurement configuration are clear and known, and the unknown variables have been calculated by this algorithm.

In some embodiments, when the PSG and PSA are one rotating polarizing plate and one rotating quarter-wave plate, respectively, according to their corresponding geometric constraints, a series of variables are set and EMW optimization is performed on the variables as follows: First, a first set of orthogonal polarization states is determined: in the first set of orthogonal polarization states, when the first polarization state is generated, a light transmission axis angle of the polarizing plate is $\theta_{1P}$; and the fast axis angle of the quarter-wave plate (hereinafter referred to as a wave plate) is $\theta_{1R}$. Then, when the polarization state orthogonal thereto is generated, according to the given geometric constraint, the angle of the polarizing plate should be $\theta_{1P}'=\theta_{1P}+90$; the angle of wave plate shall be $\theta_{1R}'=\theta_{1R}$. If the instrumental matrix for eight times of measurement is to be generated, three additional sets of orthogonal polarization states need to be generated in the same way, with the angles of polarizing plate and wave plate being respectively:

$\theta_{2P}$, $\theta_{2R}$; $\theta_{2P}+90$, $\theta_{2R}$ $\theta_{3P}$, $\theta_{3R}$; $\theta_{3P}+90$, $\theta_{3R}$ $\theta_{4P}$, $\theta_{4R}$; $\theta_{4P}+90$, $\theta_{4R}$ This results in four sets of orthogonal polarization states represented by eight variables $\theta_{1P}$, $\theta_{1R}$; $\theta_{2P}$, $\theta_{2R}$; $\theta_{3P}$, $\theta_{3R}$; $\theta_{4P}$, $\theta_{4R}$. Both polarization states in each set can be represented by the corresponding variables of each set. The EWV represented by the eight variables can then be obtained by combining a series of polarization states generated by the eight variables into an instrumental matrix. Then the EWV obtained is optimized by genetic algorithm. The result of an embodiment of the present disclosure is computed by a genetic algorithm, but other different optimization algorithms can accomplish this by minimizing and optimization of a result computed from a plurality of variables.

% An example of the genetic algorithm is as follows:

%% This statement directly calls Matlab's own genetic algorithm function ga, the use of which is described below:

[OutputVariables,EWV]=ga(@(UnknowVariables)fitfunc (UnknowVariables),8,[ ],[ ],[ ],[ ],[0 0 0 0 0 0 0 0],[180 180 180 180 180 180 180 180]);

% OutputVariables, EWV is A final output of the genetic algorithm, and OutputVariables is the optimized configuration setting, and EWV is the equal-weighted variance of the instrumental matrix formed by the optimized configuration.

% The first input to the ga function, fitfunc, is a self-defined objective function, and the contents and method of definition thereof are detailed in lines 40-75 of the code section.

% The second input 8 of the ga function is the number of variables. In this example, there are 8 variables, so the input is set to 8.

% The third through six inputs to the ga function are some of the parameter settings for the genetic algorithm itself, here selected as default settings, and [ ] is feasible.

% The seventh input to the ga function is a minimum value range of the variable, where all 8 are given as 0, i.e. [0 0 0 0 0 0 0 0].

% The eighth input to the ga function is a maximum value range of the variable, where all 8 are given as 180, i.e. [180 180 180 180 180 180 180 180].

% All eight variables range from 0 to 180 degrees.

```
% According to the relationship between the obtained variables and geometric constraints, the remaining configurations represented by variables are calculated:
theat_R1=OutputVariables(1);
theat_P1=OutputVariables(2);
theat_P1_r=theat_P1+90;
theat_R1_r-theat_R1;
theat_R2=OutputVariables(3);
theat_P2=OutputVariables(4);
theat_P2_r-theat_P2+90;
theat_R2_r=theat_R2;
theat_R3=OutputVariables(5);
theat_P3=OutputVariables(6);
theat_P3_r-theat_P3+90;
theat_R3 r=theat_R3;
theat_R4=OutputVariables(7);
theat_P4=OutputVariables(8);
theat_P4_r-=theat_P4+90;
theat_R4_r=theat_R4;
% The resulting configuration and EWV are displayed.
disp(streat('Angles of polarizing plate in eight times of measurement are respectively',num2str(theat_P1),',',num2str(theat_P1_r),',',num2str(theat_P2),',',num2str(theat_P2_r),',',num2str(theat_P3),',',num2str(theat_P3_r),',',num2str(theat_P4),',',num2str(theat_P4_r)));
disp(streat('Angles of wave plate in eight times of measurement are respectively',num2str(theat_R),',',num2str(theat_R1_r),',',num2str(theat_R2),',',num2str(theat_R2_r),',',num2str(theat_P3),',',num2str(theat_R3_r),',',num2str(theat_R4),',',num2str(theat_R4_r)));
disp(streat('EWV of the final instrumental matrix is', num2str(EWV)));
% This function is a self-defined objective function with inputs as variables and outputs as values for optimization objectives:
function Fitness=fitfunc(variables)
% First some basic values are defined, including a polaroid Müller matrix, a waveplate Müller matrix, an incident natural light, so as to calculate Stokes:
MLR=@(x,y)[1,0,0,0;
0,cosd(2*x)^2+sind(2*x)^2*cosd(y),cosd(2*x)*sind(2*x)*(1-cosd(y)),−sind(2*x)*sind(y);
0,cosd(2*x)*sind(2*x)*(1-cosd(y)),sind(2*x)^2+cosd(2*x)^2*cosd(y),cosd(2*x)*sind(y);
0,sind(2*x)*sind(y),−cosd(2*x)*sind(y),cosd(y)]; % wave plate Müller matrix formula, wherein x is the fast axis angle, y is the phase retardation;
MLD=@(x)0.5*[1,cosd(2*x),sind(2*x),0;
cosd(2*x),cosd(2*x)^2,−cosd(2*x)*sind(2*x),0;
sind(2*x),sind(2*x)*cosd(2*x),sind(2*x)^2,0;
0,0,0,0]; % Müller matrix formula of the polarizing plate, wherein x is the main optical axis angle;
inputlight=[1;0;0;0]; % the input is a beam of natural light without polarization effects.
% then a series of Stokes are calclulated.
% A first set of Stokes:
Stokes1=MLR(variables(1),90)*MLD(variables(2))*inputlight;% Stokes1 represented by the 1st and 2nd variables are obtained.
Stokes1_r=MLR(variables(1),90)*MLD(variables(2)+90)*inputlight;% Stokes1_r, which is represented by the 1st and 2nd variables and is orthogonal to Stokes1. The following is the same and will not be described in detail.
% The second set of Stokes:
Stokes2=MLR(variables(3),90)*MLD(variables(4))*inputlight;
Stokes2r=MLR(variables(3),90)*MLD(variables(4)+90)*inputlight;
% The third set of Stokes:
Stokes3=MLR(variables(5),90)*MLD(variables(6))*inputlight;
Stokes3r=MLR(variables(5),90)*MLD(variables(6)+90)*inputlight;
% the fourth set of Stokes:
Stokes4=MLR(variables(7),90)*MLD(variables(8))*inputlight;
Stokes4_r=MLR(variables(7),90)*MLD(variables(8)+90)*inputlight;
% Once all Stokes are obtained, they are assembled into an instrumental matrix:
InstrumentMatrix=[Stokes1 Stokes1_r Stokes2 Stokes2_r Stokes3 Stokes3_r Stokes4 Stokes4_r];
% EWV for this instrumental matrix is calculated:
ewv=trace((pinv(InstrumentMatrix))'*pinv(InstrumentMatrix));
% The optimization goal is defined as EWV.
Fitness-cwv;
end
```

Figure 8:
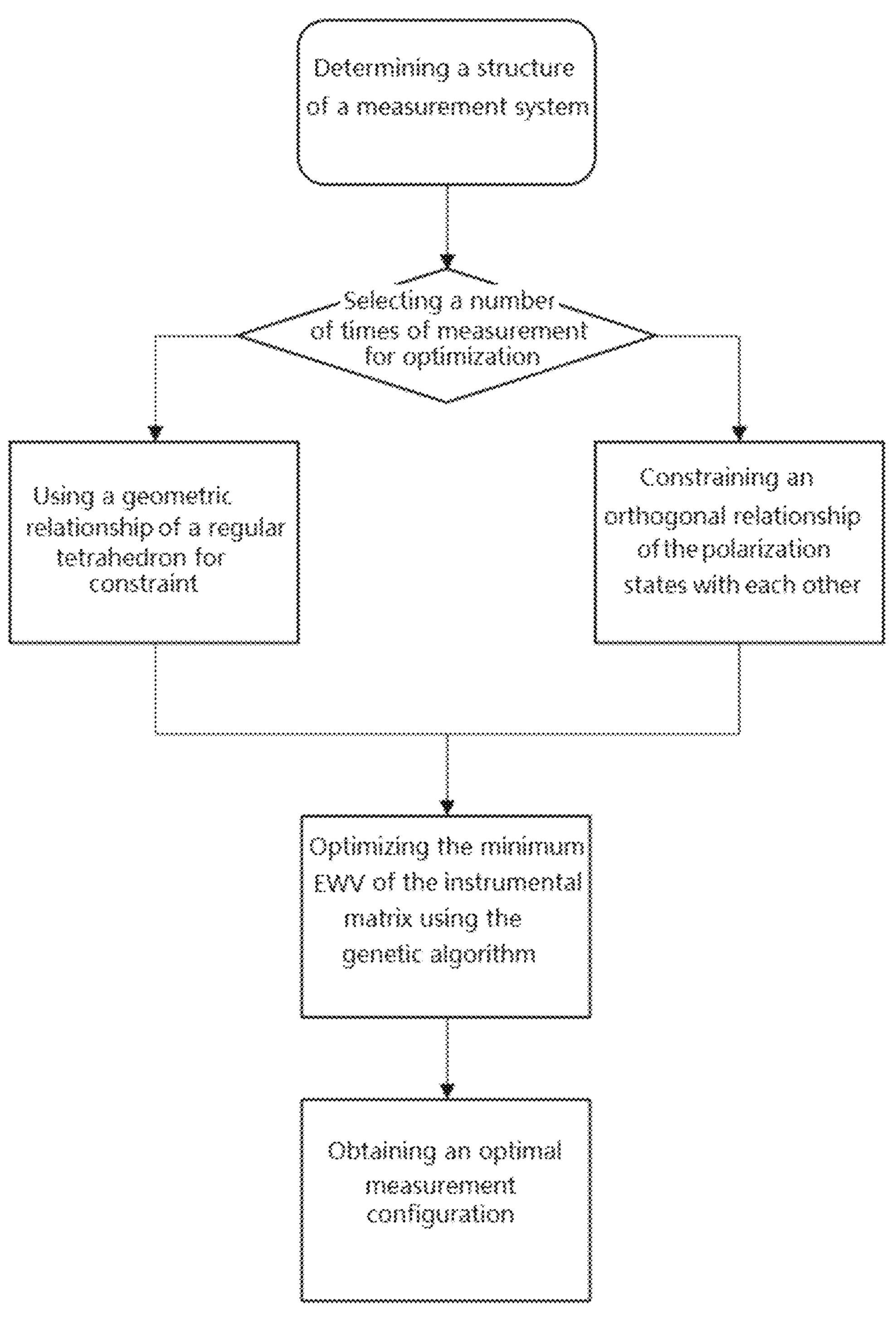
FIG. 8 is a flow diagram of a PSG and PSA configuration optimization method of an embodiment of the present disclosure.

In summary, FIG. 8 is a flow diagram of a PSG and PSA configuration optimization method of an embodiment of the present disclosure.

The embodiment of the present disclosure systematically proposes a method of optimizing a polarization measurement system (PSG/PSA) focused on giving a realistic realizable specific instrument configuration for an instrumental matrix that satisfies Miller matrix measurements with a sample-independent estimated Poisson noise variance of 16 elements. Existing measurements mostly do not take into account the suppression of Poisson noise or just from the measurement principle, explain under what instrumental matrix the noise can be suppressed, do not give a configuration that can be referenced or can be actually realized with existing devices. Embodiments of the present disclosure perform geometric constraints through the above-mentioned relationship so as to calculate an instrument configuration in a specific measurement, and satisfy the above-mentioned relationship so as to obtain a corresponding configuration deformation by the method.

The working procedures and final results of the embodiments of the present disclosure are given below.

The measurement system configuration to be used is first determined, which, in addition to the one particular configuration already given above, needs to satisfy the modulation of the full polarization state, both as PSG and PSA. Secondly, it is determined whether four acquisition measurements or multiple acquisition measurements are optimized. For these two cases, the constraint conditions for each set of polarization states are determined, and each set of polarization states is constrained by the actual configuration of the measurement system by means of the law of changing polarization states of different polarization elements. The constrained polarization states represented by the actual configuration are then combined into one instrumental matrix, and the minimum EWV optimization is performed on the instrumental matrix using a genetic algorithm or a similar optimization algorithm. The optimal actual configuration can be obtained.

The configuration of a partial polarizing and analyzing system given by the PSG and PSA configuration optimization method according to an embodiment of the present disclosure is as follows:

One rotating polarizing plate and one rotating quarter-wave plate.

| number of collection points | parameters | actual configuration |
|---|---|---|
| 4 | $\theta_P$ | 4.87°, 85.13°, 94.87°, 175.13° |
| | $\theta_Q$ | 22.50°, 67.50°, 112.50°, 157.50° |
| 4 | $\theta_P$ | 130.13°, 139.87°, 40.13°, 49.87° |
| | $\theta_Q$ | 112.50°, 157.50°, 22.50°, 67.50° |
| 8 | $\theta_P$ | 19.27°, 109.27°, 163.89°, 73.89° |
| | $\theta_Q$ | 180.00°, 180.00°, 179.88°, 179.88° |

One fixed polarizing plate, one rotating half-wave plate and one rotating quarter-wave plate.

| number of collection points | parameters | actual configuration |
|---|---|---|
| 4 | $\theta_P$ | 0° |
| | $\theta_H$ | 2.433°, 42.567°, 137.433°, 87.567° |
| | $\theta_Q$ | 22.50°, 67.50°, 112.50°, 157.50° |
| 4 | $\theta_P$ | 0° |
| | $\theta_H$ | 47.433°, 177.567°, 2.433°, 42.567° |
| | $\theta_Q$ | 22.50°, 67.50°, 112.50°, 157.50° |
| 8 | $\theta_P$ | 0° |
| | $\theta_H$ | 171.46°, 36.46°, 0.33°, 45.44° |
| | $\theta_Q$ | 155.71°, 155.71°, 8.14°, 8.14° |

One fixed polarizing plate and two full-wave retardation phase modulation devices.

| number of collection points | parameters | actual configuration |
|---|---|---|
| 4 | $\theta_P$ | 0° |
| | $\theta_{F1}$ | 45° |
| | $\theta_{F2}$ | 0° |
| | $\delta_{F1}$ | 305.26°, 234.74°, 125.26°, 54.74° |
| | $\delta_{F2}$ | 225.00°, 315.00°, 315.00°, 225.00° |
| 4 | $\theta_P$ | 0° |
| | $\theta_{F1}$ | 45° |
| | $\theta_{F2}$ | 0° |
| | $\delta_{F1}$ | 234.74°, 305.26°, 54.74°, 125.26° |
| | $\delta_{F2}$ | 45.00°, 135.00°, 135.00°, 45.00° |
| 8 | $\theta_P$ | 0° |
| | $\theta_{F1}$ | 45° |
| | $\theta_{F2}$ | 0° |
| | $\delta_{F1}$ | 105.04°, 285.04°, 292.52°, 112.52° |
| | $\delta_{F2}$ | 185.96°, 185.96°, 66.94°, 66.94° |

One fixed polarizing plate and two half-wave retardation phase modulation devices.

| number of collection points | parameters | actual configuration |
|---|---|---|
| 4 | $\theta_P$ | 22.5° |
| | $\theta_{H1}$ | 67.5° |
| | $\theta_{H2}$ | 90° |
| | $\delta_{H1}$ | 35.26°, 144.74°, 144.74°, 35.26° |
| | $\delta_{H2}$ | 0°, 180°, 0°, 180° |
| 4 | $\theta_P$ | −22.5° |
| | $\theta_{H1}$ | 22.5° |
| | $\theta_{H2}$ | 45° |
| | $\delta_{H1}$ | 35.26°, 144.74°, 144.74°, 35.26° |
| | $\delta_{H2}$ | 0°, 180°, 0°, 180° |

The configurations a) to d) above all satisfy that a sum of each row of an instrumental matrix W of a PSG and an instrumental matrix A of an PSA is zero, and an EWV of the instrument matrices of the PSG and the PSA is optimal, so as to optimize a performance of a Müller measurement system against Gaussian-Poisson mixed noise.

When the corresponding structure is used for measurement, it is necessary to set the configuration of each element according to the parameters given in the table. For example, when measurement is performed with a rotating polarizing plate and a rotating wave plate, the first four-point configuration given in table a) can be used, i.e. first polarization is performed by rotating the polarizing plate to 4.87 degrees and the wave plate to 22.5 degrees, and then rotating the polarizing plate to 85.13 degrees, and rotating the wave plate to 67.5 degrees to perform a second time of polarization; the PSG is then rotated to 94.87 degrees and the wave plate is rotated to 112.5 degrees to perform a third time of polarization; finally the polarizing plate is rotated to 175.13 degrees and the wave plate is rotated to 157.5 degrees to perform a fourth time of polarization. At the same time, it is also necessary to perform analyzing once for each polarization. The process of analyzing is similar to that of polarizing. According to the structure of the PSA used, the specific configuration given in the table corresponding to the structure is selected, and four or eight times of measurement and analyzing are performed. That is, if four times of measurement are used for both polarizing and analyzing, a total of 16 times of measurement are required.

Compared with the conventional measurement configuration, the PSG and PSA configuration optimization method of the embodiment of the present disclosure systematically combines the measurement configuration with the optimization of Gaussian-Poisson mixed noise, which can guide the actual measurement and optimize the measurement system. The traditional measurement system which does not use the best measurement configuration can still perform measurement, but its accuracy is limited, it can not suppress the noise in the system, and the noise law is not clear, and thus it is difficult to calculate noise reduction in the later work. The measurement configuration optimized by this method improves this problem. Firstly, the noise transmission in the system is minimized and the noise is suppressed to the maximum extent. Secondly, the noise distribution law is independent with the samples. No matter what kind of samples are measured, the noise distribution law is the same. At the same time, this method also has universality and can be optimized for various measurement systems with different structures.

Embodiment 2

Figure 9:
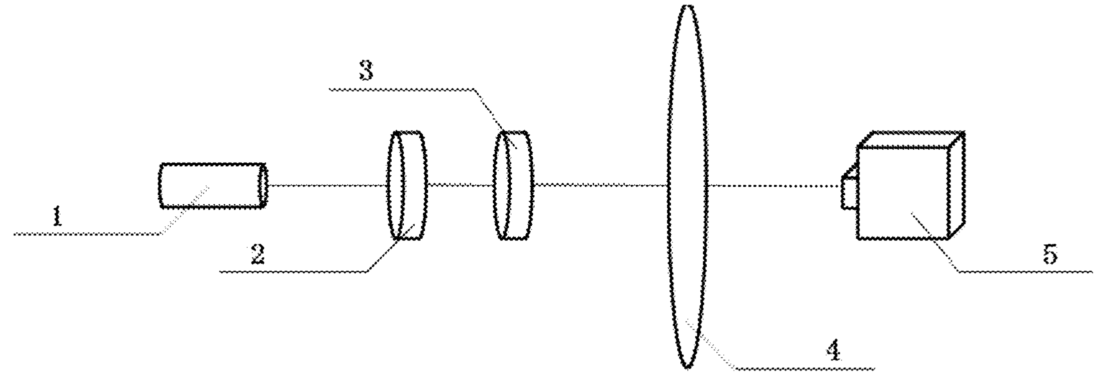
FIG. 9 is a schematic diagram of a Müller matrix measurement system based on a PSG in an embodiment of the present disclosure.

The embodiment provides a PSG capable of achieving arbitrary polarization state modulation, including: an illumination system, a rotatable polarizing plate, and a rotatable quarter-wave plate, wherein the illumination system is configured to generate incident light; the incident light is modulated to a desired polarized light by a combination of different rotation angles of the polarizing plate and the quarter-wave plate. By changing the orientation of the polarizing plate and rotating the quarter-wave plate for one revolution at each orientation, arbitrary polarization state modulation is achieved. the polarizing plate and the quarter-wave plate are respectively driven to rotate by a corresponding electric precision rotary displacement stage. FIG. 9 is a schematic diagram of a Müller matrix measurement system based on a PSG, specifically, a transmission type Müller matrix measurement system. Referring to FIG. 9, light emitted from a LED light source 1 is incident on a sample 4 through a polarizing plate 2 and a quarter-wave plate 3, and light transmitted from the sample 4 is received by an PSA 5. The Müller matrix image of the sample 4 is finally calculated according to multiple times (not less than 4 times) of modulation by the polarizing plate 2 and quarter-wave plate 3 and analyzing by the PSA 5.

Figure 10:
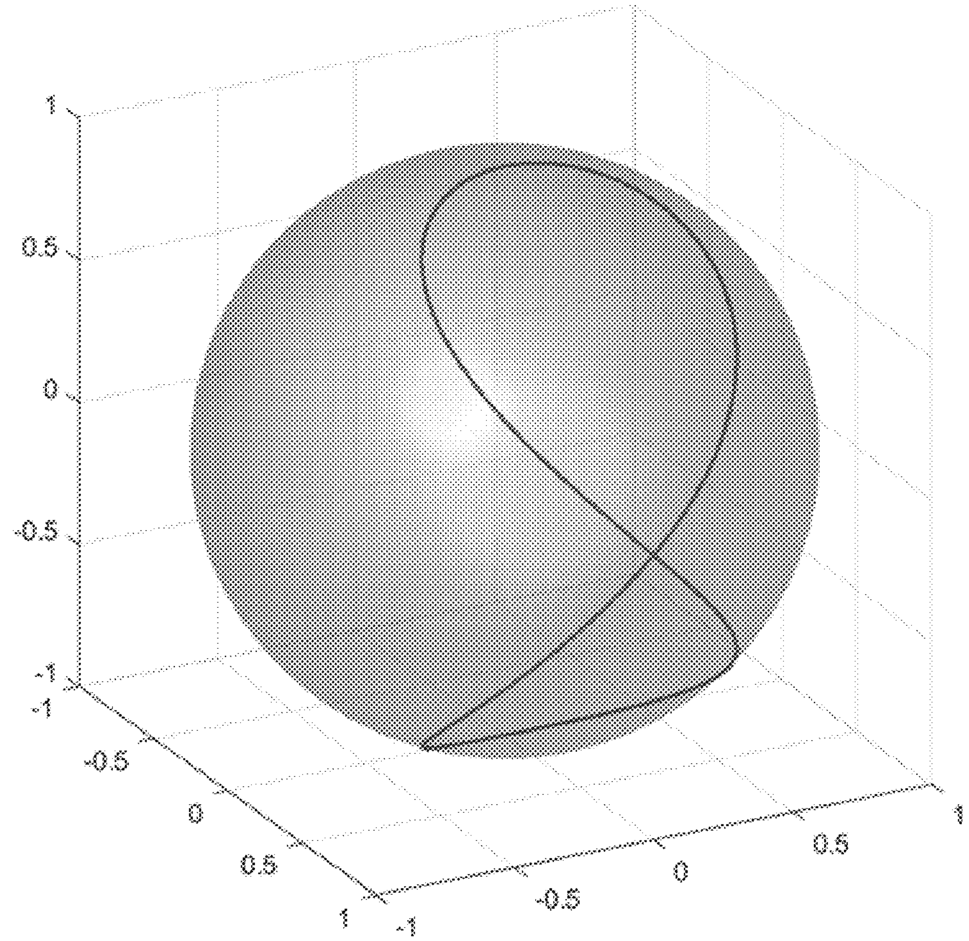
FIG. 10 is a representation of the polarization state that could be traversed by a polarization mode with the polarizing plate fixed at 0° and the quarter-wave plate rotated for one revolution on Poincaré sphere.
Figure 11:
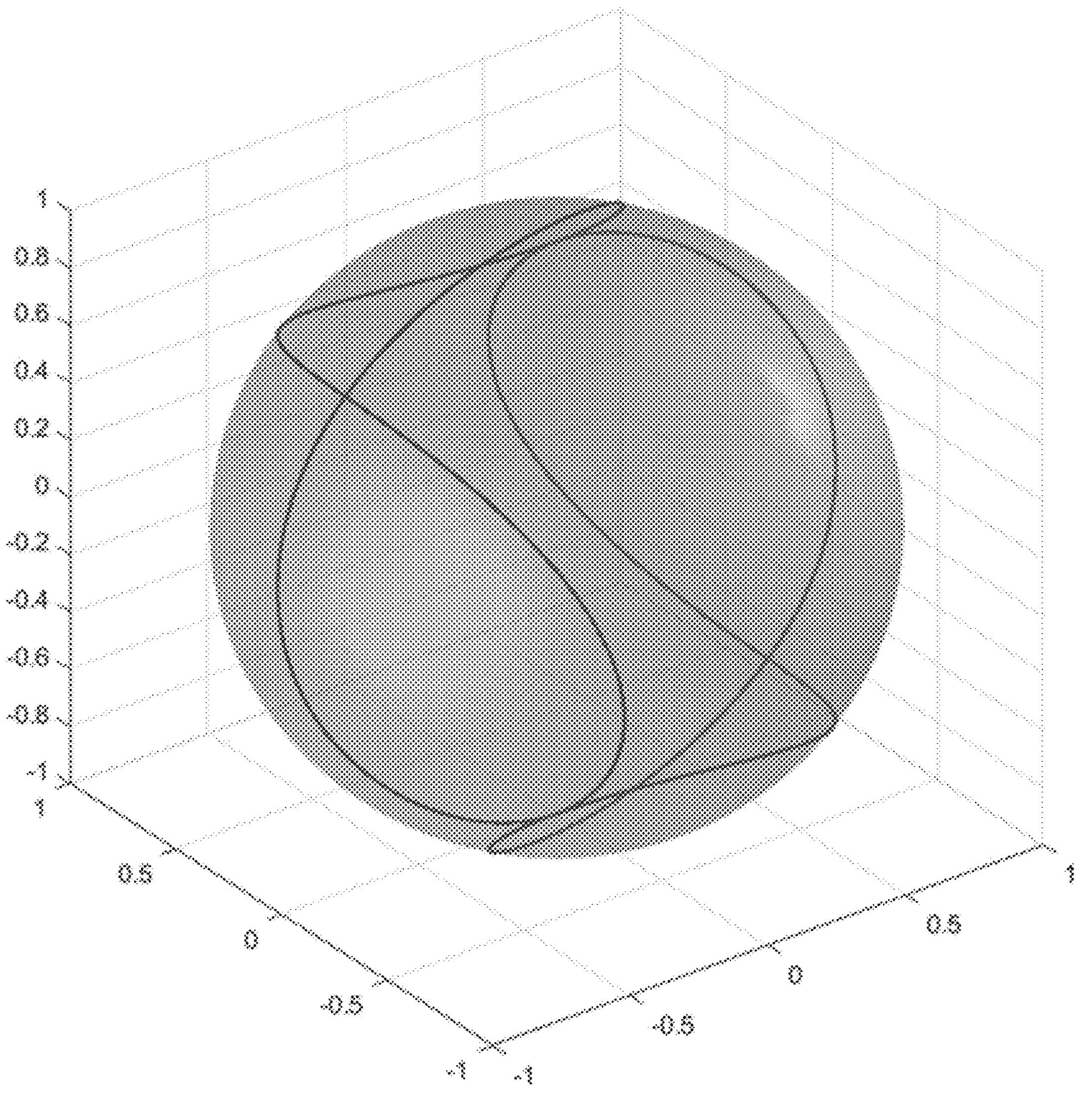
FIG. 11 is a representation of the polarization state that could be traversed by a polarization mode with the quarter-wave plate rotated for one revolution when the polarizing plate is fixed at 450 and 135°, respectively, on Poincaré sphere.
Figure 12:
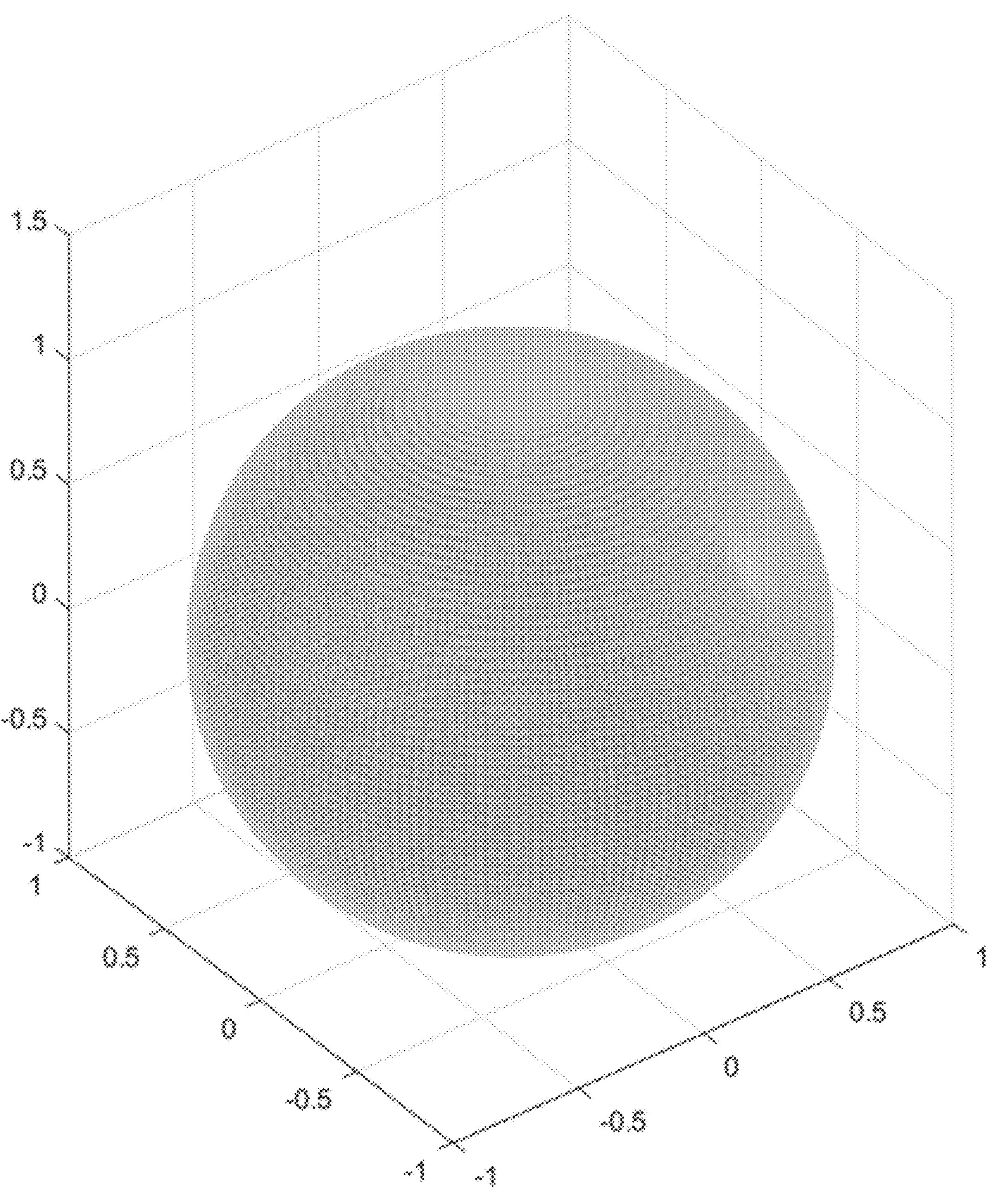
FIG. 12 is a representation of the polarization states that could be traversed by a polarization mode that simultaneously rotates the polarizing plate and the quarter-wave plate for one revolution on Poincaré sphere.
Figure 13A:
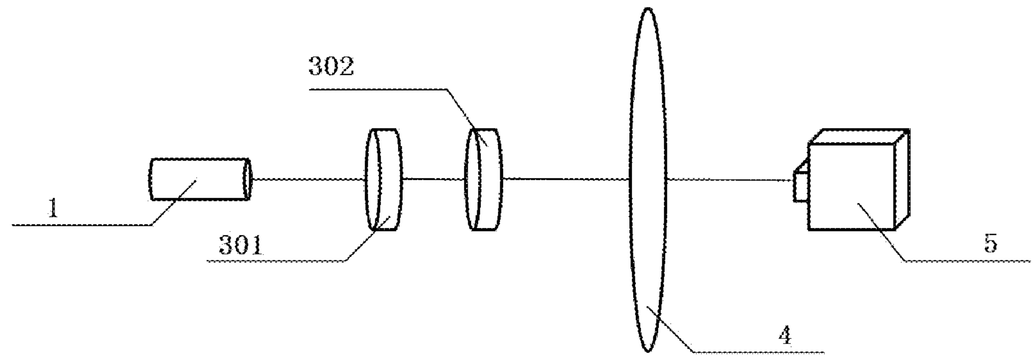
FIGS. 13*a-d* are schematic diagrams of four configurations of a polarizing and analyzing system comprising both a polarization state generator (PSG) and a polarization state analyzer (PSA) in embodiments of the present disclosure.
Figure 13B:
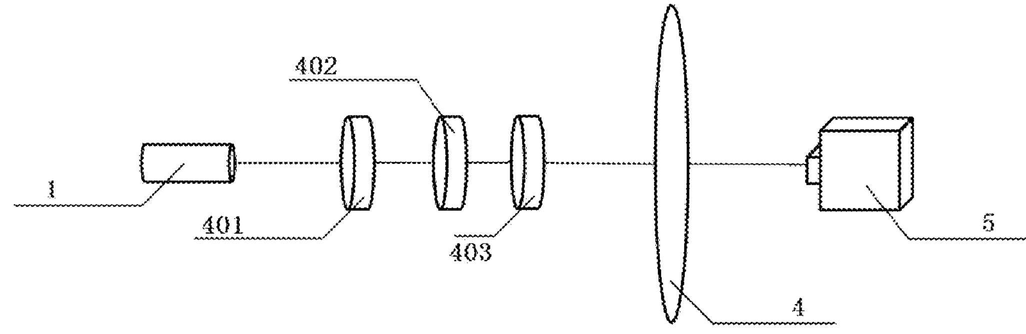
Figure 13C:
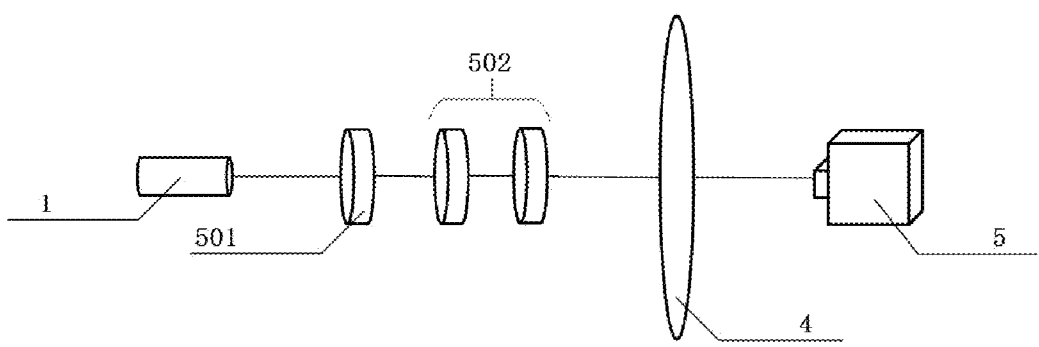
Figure 13D:
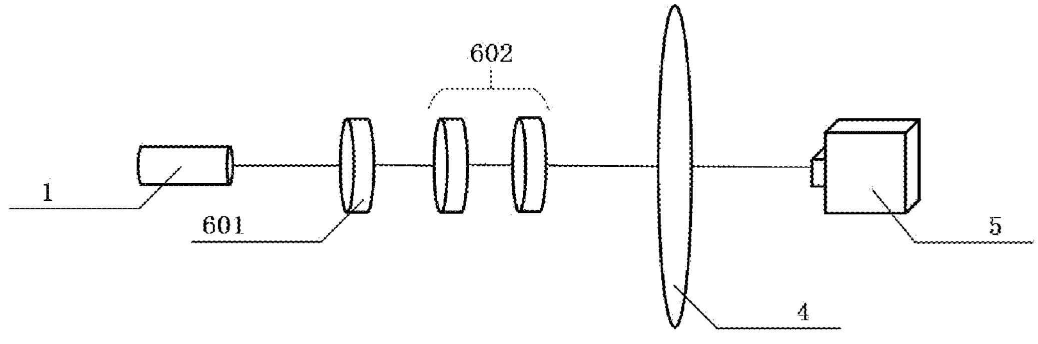

Any polarization state modulation can be achieved for the PSG of this embodiment, which is based on the polarizing mode of fixed polarizing plate and rotating quarter-wave plate. With the polarizing plate fixed at 0°, the quarter-wave plate is rotated for one revolution, all possible polarization states that it can traverse on the Poincaré sphere are shown in FIG. 10, and the polarization states that it can traverse can only be an "8" shaped area on the Poincaré sphere. When the polarizing plate is fixed at 45° and 135°, respectively, the quarter-wave plate is rotated once to obtain two corresponding "8"-shaped areas, and it can be seen in FIG. 11 that the two "8"-shaped areas have the same shape, but the orientation of the "8"-shaped area on a Poincaré ball is different due to the change in the orientation of the polarizing plate; the orientations of 450 and 135° are orthogonal, reflecting that on the Poincare sphere they should be on both sides of the sphere, which is also well reflected in FIG. 11. This forms the basis for the PSG of this embodiment to be capable of producing any polarization state, i.e. the basis for the polarization manner of the present embodiment can traverse any point on Poincaré sphere. That is, when the polarizing plate is fixed at fixed at an arbitrary angle, the polarization state that can be traversed by rotating the quarter-wave plate alone is an "8" shape on the Poincaré sphere. However, the orientation of the "8" shape changes with the orientation of the polarizing plate. Thus, by rotating both the polarizing plate and the quarter-wave plate, any polarization state on the Poincaré sphere can be traversed, and the polarization states that can be traversed on the sphere are shown in FIG. 12.

Another variant of this embodiment proposes an optimization method for the PSG described above, by taking the actual physical configuration, i.e. taking the orientation of the polarizing plate and the fast axis angle of the quarter-wave plate as optimization objectives, and solving an optimal uniform distribution state of the corresponding polarization state on the Poincaré sphere by an iterative method of potential minimum, which simultaneously satisfies the conditions of an optimal condition number. Specifically, by taking the actual polarizing plate orientation and the fast axis angle of the quarter-wave plate as a direct optimization quantity, a Stokes vector of a polarization state generated by each modulation is calculated using an orientation of the polarizing plate and a fast axis angle of the quarter-wave plate, and the calculated Stokes vector is mapped onto Poincaré sphere to display a corresponding position of a corresponding polarization state on the Poincaré sphere; then, the corresponding positions of each polarization state are uniformly distributed and optimized on the Poincaré sphere to find an optimal PSG instrumental matrix configuration, which satisfies a minimum condition number index. Such an optimized configuration can reduce the transmission ratio of the system error to the final measurement result, thereby realizing high-precision and low-error Müller matrix measurement.

Each modulation corresponds to one orientation of the polarizing plate and one fast axis angle of the quarter-wave plate, namely, each modulation corresponds to a pair of rotation angles; each modulation corresponds to one polarization state, namely Stokes vector. We are capable of regarding the corresponding position point of the polarization state corresponding to each pair of rotation angles on the Poincaré sphere as a point charge, taking a minimum potential energy between the point charges as a search target, and using a global search algorithm to take an orientation of the polarizing plate and the fast axis angle of the quarter-wave plate corresponding to a minimum total potential energy as an optimal configuration to realize the optimization of the PSG, wherein the optimal configuration corresponds to a PSG instrumental matrix configuration under the minimum condition number, For a forward (transmissive) Müller matrix measurement system, when incident polarized light is transmitted through the sample, the polarization state of the transmitted polarized light changes compared to the incident polarized light. Through the polarization modulation of the PSG and the polarization modulation of the PSA of not less than four times, the Müller matrix image of the sample can be calculated through the light intensity map collected by an imaging element after passing through the PSA, which can be expressed as:

$$I=AMW$$

where A represents the instrumental matrix of the PSA, W represents the instrumental matrix of the PSG, M represents the Müller matrix of the sample, and I is the detected light intensity. $K_A$ is defined as a condition number of instrumental matrix A of the PSA and $K_W$ is defined as a condition number of the instrumental matrix W of the PSG. For a Müller matrix measurement system, the error of the final measured Müller matrix is related to the system error as follows: $\|\Delta M\|/\|M\| \le K_W K_A \|\Delta I\|/\|I\| + K_A \|\Delta A\|/\|A\| + K_W \|\Delta W\|/\|W\|$ $\|\Delta M\|/\|M\|$ represents an error of the Müller matrix finally measured, and $\|\Delta I\|/\|I\|$, $\|\Delta A\|/\|A\|$, and $\|\Delta W\|/\|W\|$ respectively represent a light intensity error, a systematic error of the PSA and a systematic error of the PSG. It can be seen that for a PSG, the smaller the condition number $K_W$ in the instrumental matrix, the lower the transfer ratio of the system error ultimately transferred to the measurement.

For a Müller matrix measurement system, the PSG is modulated a minimum of four times in order to obtain a Müller matrix. Let the number of times of modulations be N, then the instrumental matrix of the PSG can be expressed as:

$$W_N=[R_{\theta 1}P_{\varphi 1}S_{in}\ R_{\theta 2}P_{\varphi 2}S_{in}]$$

$R_{\theta i}$(i=1,2, . . . , N) shows the Müller matrix of the wave plate when the fast axis angle of the quarter-wave plate is located in $\theta_i$=1,2, N) $P_{\varphi i}$(i=represents the Müller matrix of the polarizing plate when the light passing direction (orientation) of the polarizing plate is located in $\varphi_i$(i=1,2, . . . N); $S_{in}$ represents the polarization state of incident light, i.e. a Stokes vector the illumination light is natural light, $S_{in}$=$[\mathbf{1\ 0\ 0\ 0}]^T$. Since the Muller matrix is 4×4, i.e. $R_{\theta i}$ and $P_{\varphi i}$ are both 4×4 matrices, and the Stokes vector $S_{in}$ of the incident light is a 4×1 of column vector, the size of $R_{\theta i}P_{\varphi i}S_{in}$ should be 4×1, and the size of the matrix $W_N$ is 4×N.

Taking the 2nd, 3rd and 4th rows of each column of the instrumental matrix of the PSG as a set of three-dimensional coordinates on the Poincaré sphere, N times of modulations correspond to N three-dimensional coordinate points on the Poincaré sphere. To solve the optimization problem, each three-dimensional coordinate point is treated as a point charge. For polarization measurements, each selected polarization/analyzation state should be as independent as possible, which means that each polarization state should be as "uniform" as possible between its corresponding points on the Poincaré sphere, i.e. the points should be equidistant from each other and as maximum as possible. This is equivalent to the problem of how to electromagnetically distribute multiple point charges on a unit sphere to achieve the minimum potential energy. Since the farther the distance is from point charge to point charge and the more evenly the point charges are distributed, the potential energy is minimized when only the effect of Coulomb force is considered. Therefore, it is in accordance with the theoretical basis to consider the polarization state of each modulation at the corresponding three-dimensional coordinate point on the Poincaré sphere as a point charge to solve the optimization problem. A minimum potential energy between the point charges is taken as a search target using a global search algorithm to take an orientation of the polarizing plate and the fast axis angle of the quarter-wave plate corresponding to a minimum total potential energy as an optimal configuration. The total potential energy E for N point charges can be calculated from the potential energy formula because there is only coulomb force interaction between charges:

$$E = \frac{1}{2}\sum_{i=1}^{N}\sum_{j\neq i}\frac{1}{|r_i - r_j|}$$

wherein $r_i$ and $r_j$ represent a position vector of an ith point charge with respect to a center of the Poincaré sphere and a position vector of a jth point charge with respect to a center of the Poincaré sphere respectively. Thus, the optimization problem becomes to find the optimal instrumental matrix W of the PSG such that E is minimized while the condition number of the entire instrumental matrix W is minimized.

Each matrix has its own corresponding condition number, so the instrumental matrix of this PSG also has its corresponding condition number. For the matrix W, its condition number C(W)=‖W‖·‖W^{−1}(‖ . . . ‖ represents a 2-norm number of a matrix). The condition number of a matrix can be solved directly in Matlab using the cond command.

In the following, the experiment was carried out by taking 4 times of modulations of the PSG as an example.

For a PSG with four times of modulations, i.e. N=4, its instrumental matrix can be expressed as:

$$W=[R_{\theta 1}P_{\varphi 1}S_{in}\ R_{\theta 2}P_{\varphi 2}S_{in}\ R_{\theta 3}P_{\varphi 3}S_{in}\ R_{\theta 4}P_{\varphi 4}S_{in}]$$

wherein it has been mentioned previously that when the PSG is modulated N times, the size of the instrumental matrix $W_N$ is 4×N. Thus, the instrumental matrix W is 4×4 under 4 times of modulations.

In the embodiment of the present disclosure, the angular rotation range of the polarizing plate and the quarter-wave plate is 0-180°, and the rotation of 180° is one revolution. Taking the angles of polarizing plate and quarter-wave plate as the direct optimization quantity, the global search algorithm is used to search the optimal solution. Specifically, the corresponding point of the polarization state (Stokes vector) corresponding to each pair of rotation angles on the Poincaré sphere is regarded as "point charge", the minimum potential energy between points is taken as the search target, the angles of the polarizing plate and quarter-wave plate corresponding to the minimum potential energy are taken as the optimal configuration, and this configuration also corresponds to the instrumental matrix configuration of the PSG under the minimum condition number. In the case of four times of modulations, an optimal angle configuration of the polarizing plate and the quarter-wave plate (the actual phase retardation of the quarter-wave plate used in the experiment is not 90°, the actual measured value is 92.725°) is obtained according to the following procedure:

Under the condition of 4 times of modulation, according to the given 4*2=8 angles (4 pairs of rotation angles), such as four angles of the polarizing plate 15.586°, 53.281°, 114.957°, 176.421° and four angles of the quarter-wave plate 149.728°, 64.121°, 125.166° and 4.59°, and according to the instrumental matrix expression $W=[R_{\theta 1}P_{\varphi 1}S_{in}\ R_{\theta 2}P_{\varphi 2}S_{in}\ R_{\theta 3}P_{\varphi 3}S_{in}\ R_{\theta 4}P_{\varphi 4}S_{in}]$ the following real value of W can be obtained:

$$W = \begin{bmatrix} 1.0000 & 1.0000 & 1.0000 & 1.0000 \\ -0.0561 & -0.5890 & -0.2998 & 0.9452 \\ 0.0027 & 0.7190 & -0.8881 & 0.1663 \\ -0.9984 & 0.3690 & 0.3485 & 0.2810 \end{bmatrix}$$

Here, the above-mentioned value of W is only an example. It should be understood that, rather than having only one solution, the method can be applied to obtain a plurality of different sets of solutions that satisfy a minimum condition number index.

The condition number of the above-mentioned matrix W is 1.732, which meets the theoretical minimum. It is shown that the optimal angle configuration of the polarizing plate and quarter-wave plate obtained by the optimization method also satisfies the minimum condition number index, which can minimize the transmission ratio of systematic errors.

Taking the polarizing plate and wave plate as the standard sample, and the standard sample also has its corresponding Müller matrix (4×4=16 array elements); firstly, the Müller matrix of the standard sample is measured through an optical path configuration measurement system as shown in FIG. 9: according to the four angles given by the optimization method (the polarizing plate has four angles, and the wave plate has four angles), the polarizing plate and the quarter-wave plate are respectively changed four times according to the corresponding angles, and by modulating the PSG N times (using 4 times in the specific example), we can obtain the column vector I composed of N sets of light intensities. Then the Müller matrix of the standard sample can be calculated as follows:

$$M=\mathrm{pinv}(A)\cdot I\cdot \mathrm{pinv}(W)$$

where pinv( ) represents the pseudo-inverse of a matrix, and when the matrix is a square matrix, it represents the inverse of the matrix. After the Müller matrix measurement values are obtained, for each array element, the error of a single array element is calculated according to the measured value $\text{measured}_k$ of the array element of the Müller matrix and how much the actual value $\text{true}_k$ of the array element should be, the respective errors of 16 array elements serve as 16 sets of error values, and the mean root mean square error $\overline{RMSE}$ of the Müller matrix array element is calculated using the following formula using the 16 sets of error values(i.e. n=16)

$$\overline{RMSE} = \sqrt{\frac{1}{n}\sum_{k=1}^{n}(\text{measured}_k - \text{true}_k)^2}$$

where k represents sequence numbers of 16 array elements of the Müller matrix. The mean root mean square error $\overline{RMSE}$ of the array elements of the Müller matrix for the polarizing plate, the quarter-wave plate and ⅛-wave plate can thus be obtained, as shown in Table 1 below:

TABLE 1

| Mean root mean square error $\overline{RMSE}$ values | | | |
|---|---|---|---|
| Standard sample | Polarizing plate wave plate polarization | Single wave plate polarization | Optimization improvement ratio |
| 70° polarizing plate | 0.0064 | 0.0102 | 37% |
| 120° polarizing plate | 0.0067 | 0.0117 | 43% |
| 70° λ/4 wave plate | 0.0057 | 0.0124 | 54% |
| 120° λ/4 wave plate | 0.0062 | 0.0116 | 52% |
| 70° λ/8 wave plate | 0.0042 | 0.0077 | 45% |
| 120° λ/8 wave plate | 0.0037 | 0.0069 | 46% |

It can be seen from the above-mentioned comparison that when the polarizing plate and the wave plate are simultaneously rotated to realize a PSG with arbitrary polarization state modulation according to the embodiment of the present disclosure, compared with the conventional polarization method with single wave plate rotation, the measurement error of the Müller matrix is reduced and the measurement accuracy is improved after optimization by the optimization method.

Relationship Description for Embodiment 1 and Embodiment 2

The following describes the relationship between embodiment 1 and embodiment 2 in principle:

1) Potential Energy and EWV:

The nature of the two is slightly different, but in the polarization optimization application scenario, although the two calculation formulas are different, when EWV is minimum, the potential energy is also minimum. This also means that the result of optimizing the minimum potential energy will also minimize EWV. At minimum optimization, the effects are equivalent, and in Embodiments 1 and 2, the EWV index and the potential energy index can be interchanged without affecting the results of the optimization. However, the potential energy index is proposed in Embodiment 2, and the EWV index is a conventional index.

2) Similarity and Difference on the Structure of the Instrument:

Embodiment 2 proposes a polarizing system with a rotating polarizing plate and a rotating quarter-wave plate (RPRQ). Embodiment 1 uses a RPRQ configuration but includes a polarizing and analyzing system. In addition, embodiment 1 additionally proposes various structures.

3) Similarity and Difference in Optimization Principle:

Embodiment 2 proposes a potential energy index to characterize the uniformity of the distribution of polarization states on Poincaré sphere, with the concept of geometric optimization. Embodiment 1 replaces the potential energy index for a more traditional EWV index, and additionally takes into account the influence of Poisson noise. Further with the concept of geometric optimization, it is proposed to limit the results by geometric constraints.

The geometric uniformity of the polarization state satisfies the minimum EWV and the minimum potential energy, which makes the system optimal for Gaussian noise;

the orthogonal or regular tetrahedrons in the polarization state geometry satisfy a sum of rows of the instrumental matrix being zero, making the system optimal for Poisson noise.

The former is used for both Embodiment 1 and Embodiment 2, and the latter is used for Embodiment 1.

4) Similarity and Difference in Optimization Results:

The results of the optimization of both Embodiment 1 and Embodiment 2 have a practical configuration rather than a simple instrumental matrix. In both cases, the relationship between the polarization state and the actual configuration is established by analyzing the geometrical change law of the polarization state of the polarizing element, so as to obtain the actual configuration. However, in Embodiment 2, only four times of polarizing and analyzing measurements are analyzed, and the method is not applied to more times of polarizing and analyzing measurements (although the method itself may be performed in the latter manner, it is not proposed).

In Embodiment 1, four and multiple times of polarizing and analyzing measurements are discussed.

5) Summary

In general, Embodiment 1 is an expansion and extension of Embodiment 2, supplemented with several additional measurement structures, with instructions that can be applied to both PSA and PSG, with additional satisfaction of the optimization of Poisson noise, and with a discussion of the optimization of multiple times of polarizing and analyzing measurements.

The foregoing is a further detailed description of the present disclosure, taken in conjunction with specific preferred embodiments, and is not to be construed as limiting the specific implementation of the present disclosure. To those skilled in the art to which the disclosure pertains, many equivalents and obvious modifications may be made without departing from the concept of the disclosure, and the same function or use is to be considered as within the scope of protection of the disclosure.

The invention claimed is:

1. A PSG and PSA configuration optimization method, comprising the steps of:

adjusting an instrumental matrix W of a PSG and an instrumental matrix A of an PSA to minimize an equal-weighted variance EWV of the instrument matrices of the PSG and the PSA, so as to realize optimization for Gaussian noise; and a sum of each row of the instrumental matrix W of the PSG and the instrumental matrix A of the PSA is zero, so that an estimated variance due to Poisson noise is independent of a sample, and the estimated variance reaches a minimum value, wherein the PSG and the PSA of a measurement system are configured so that their polarization states are mutually orthogonal: then a minimum equal-weighted variance EWV of the instrument matrices of the PSG and the PSA are searched: an optimal configuration is achieved when the instrument matrices of the PSG and PSA satisfy conditions of the sum of rows being zero and minimum EWV simultaneously:

wherein when the PSG and the PSA are a rotating polarizing plate and a rotating quarter-wave plate, respectively, a configuration condition for making the polarization states of the PSG and the PSA mutually orthogonal satisfies the following relationship:

$$\theta_P' = \theta_P + 90^\circ$$

in the formula, $\theta_p$ is a direction of a light transmission axis of the polarizing plate configured for a first measurement, $\theta_R$ is an angular direction of a fast axis of the quarter-wave plate configured for the first measurement, $\theta_p'$ is a direction of the light transmission axis of the polarizing plate configured for a second measurement, and $\theta_R'$ is an angular direction of the fast axis of the quarter-wave plate configured for the second measurement; the method adjusts a main light passing direction of polarization via the polarizing plate and then realizes modulation of a specific polarization state via the quarter-wave plate.

2. The PSG and PSA configuration optimization method according to claim 1, wherein the PSG and the PSA both satisfy modulation of a full polarization state.

3. A PSG and PSA configuration optimization method, comprising the steps of:

adjusting an instrumental matrix W of a PSG and an instrumental matrix A of an PSA to minimize an equal-weighted variance EWV of the instrument matrices of the PSG and the PSA, so as to realize optimization for Gaussian noise; and a sum of each row of the instrumental matrix W of the PSG and the instrumental matrix A of the PSA is zero, so that an estimated variance due to Poisson noise is independent of a sample, and the estimated variance reaches a minimum value;

wherein when the PSG and the PSA are a rotating polarizing plate and a rotating quarter-wave plate, respectively, an optimal four-point measurement configuration of the PSG and the PSA satisfies the following relationship:

$$\begin{cases} \theta'_P = \theta_P + 90^\circ \\ \theta'_R = \theta_R + 90^\circ \end{cases}$$

$$\begin{cases} \theta''_P = -\theta_P \\ \theta''_R = -\theta_R \end{cases}$$

$$\begin{cases} \theta'''_P = 90^\circ - \theta_P \\ \theta'''_R = 90^\circ - \theta_R \end{cases}$$

in the formula, $\theta_P$ is a direction of a light transmission axis of the polarizing plate configured for a first measurement, $\theta_R$ is an angular direction of a fast axis of the quarter-wave plate configured for the first measurement, $\theta_p'$ is a direction of the light transmission axis of the polarizing plate configured for a second measurement, $\theta_R'$ is an angular direction of the fast axis of the quarter-wave plate configured for the second measurement, $\theta_P''$ is a direction of the light transmission axis of the polarizing plate configured for a third measurement, $\theta_R''$ is an angular direction of the fast axis of the quarter-wave plate configured for the third measurement, $\theta_p'''$ is a direction of the light transmission axis of the polarizing plate configured for a fourth measurement, and $\theta_R'''$ is an angular direction of the fast axis of the quarter-wave plate configured for the fourth measurement.

4. A polarizing and analyzing system, wherein it is configured such that a sum of each row of an instrumental matrix W of a PSG and an instrumental matrix A of an PSA is zero, and an equal-weighted variance EWV of the instrument matrices of the PSG and the PSA is minimum, so as to optimize a performance of a Müller measurement system against Gaussian-Poisson mixed noise;

the polarizing and analyzing system comprises one rotating polarizing plate and one rotating quarter-wave plate, which are configured as follows:

| number of collection points | parameters | actual configuration |
|---|---|---|
| 4 | $\theta_P$ | 4.87°, 85.13°, 94.87°, 175.13° |
| | $\theta_Q$ | 22.50°, 67.50°, 112.50°, 157.50° |
| 4 | $\theta_P$ | 130.13°, 139.87°, 40.13°, 49.87° |
| | $\theta_Q$ | 112.50°, 157.50°, 22.50°, 67.50° |
| 8 | $\theta_P$ | 19.27°, 109.27°, 163.89°, 73.89° |
| | | 26.08°, 116.08°, 118.57°, 28.57° |
| | $\theta_Q$ | 180.00°, 180.00°, 179.88°, 179.88° |
| | | 43.76°, 43.76°, 136.09°, 136.09° |

alternatively, the polarizing and analyzing system comprises one fixed polarizing plate, one rotating half-wave plate and one rotating quarter-wave plate, which are configured as follows:

| number of collection points | parameters | actual configuration |
|---|---|---|
| 4 | $\theta_P$ | 0° |
| | $\theta_H$ | 2.433°, 42.567°, 137.433°, 87.567° |
| | $\theta_Q$ | 22.50°, 67.50°, 112.50°, 157.50° |
| 4 | $\theta_P$ | 0° |
| | $\theta_H$ | 47.433°, 177.567°, 2.433°, 42.567° |
| | $\theta_Q$ | 22.50°, 67.50°, 112.50°, 157.50° |
| 8 | $\theta_P$ | 0° |
| | $\theta_H$ | 171.46°, 36.46°, 0.33°, 45.44° |
| | | 129.11°, 174.11°, 160.58°, 25.58° |
| | $\theta_Q$ | 155.71°, 155.71°, 8.14°, 8.14° |
| | | 127.84°, 127.84°, 36.82°, 36.82° |

alternatively, the polarizing and analyzing system comprises one fixed polarizing plate and two full-wave retardation phase modulation devices, which are configured as follows:

| number of collection points | parameters | actual configuration |
|---|---|---|
| 4 | $\theta_P$ | 0° |
| | $\theta_{F1}$ | 45° |
| | $\theta_{F2}$ | 0° |
| | $\delta_{F1}$ | 305.26°, 234.74°, 125.26°, 54.74° |
| | $\delta_{F2}$ | 225.00°, 315.00°, 315.00°, 225.00° |
| 4 | $\theta_P$ | 0° |
| | $\theta_{F1}$ | 45° |
| | $\theta_{F2}$ | 0° |
| | $\delta_{F1}$ | 234.74°, 305.26°, 54.74°, 125.26° |
| | $\delta_{F2}$ | 45.00°, 135.00°, 135.00°, 45.00° |
| 8 | $\theta_P$ | 0° |
| | $\theta_{F1}$ | 45° |
| | $\theta_{F2}$ | 0° |
| | $\delta_{F1}$ | 105.04°, 285.04°, 292.52°, 112.52° |
| | $\delta_{F2}$ | 185.96°, 185.96°, 66.94°, 66.94° |

alternatively, the polarizing and analyzing system comprises one fixed polarizing plate and two half-wave retardation phase modulation devices, which are configured as follows:

| number of collection points | parameters | actual configuration |
|---|---|---|
| 4 | $\theta_P$ | 22.5° |
| | $\theta_{H1}$ | 67.5° |
| | $\theta_{H2}$ | 90° |
| | $\delta_{H1}$ | 35.26°, 144.74°, 144.74°, 35.26° |
| | $\delta_{H2}$ | 0°, 180°, 0°, 180° |
| 4 | $\theta_P$ | −22.5° |
| | $\theta_{H1}$ | 22.5° |

-continued

| number of collection points | parameters | actual configuration |
|---|---|---|
| | $\theta_{H2}$ | 45° |
| | $\delta_{H1}$ | 35.26°, 144.74°, 144.74°, 35.26° |
| | $\delta_{H2}$ | 0°, 180°, 0°, 180°. |

* * * * *